(12) United States Patent
Mino et al.

(10) Patent No.: US 10,819,963 B2
(45) Date of Patent: Oct. 27, 2020

(54) DISPLAY DEVICE, METHOD FOR CONTROLLING DISPLAY DEVICE, PROGRAM, RECORDING MEDIUM, AND MOVING BODY EQUIPPED WITH DISPLAY DEVICE

(71) Applicant: Panasonic Intellectual Property Management Co., Ltd., Osaka (JP)

(72) Inventors: Yoshiteru Mino, Osaka (JP); Kosuke Kubota, Osaka (JP); Masahito Ogata, Osaka (JP); Yuta Yamamoto, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/542,302

(22) Filed: Aug. 16, 2019

(65) Prior Publication Data

US 2019/0373230 A1    Dec. 5, 2019

Related U.S. Application Data

(63) Continuation of application No. PCT/JP2018/004961, filed on Feb. 14, 2018.

(30) Foreign Application Priority Data

Feb. 28, 2017  (JP) .................................. 2017-037682
Feb. 28, 2017  (JP) .................................. 2017-037683

(51) Int. Cl.
  *H04N 9/31*   (2006.01)
  *B60K 37/02*  (2006.01)
  *G03B 21/14*  (2006.01)

(52) U.S. Cl.
  CPC ............ *H04N 9/3185* (2013.01); *B60K 37/02* (2013.01); *G03B 21/142* (2013.01); *B60K 2370/1529* (2019.05)

(58) Field of Classification Search
  CPC .................. H04N 9/3185; B60K 37/02; B60K 2370/1529; G03B 21/142; G06F 1/1639; G06F 3/0425
  See application file for complete search history.

(56) References Cited

U.S. PATENT DOCUMENTS

2009/0160736 A1   6/2009  Shikita
2016/0178902 A1   6/2016  Ando et al.
(Continued)

FOREIGN PATENT DOCUMENTS

JP    5-038966    2/1993
JP    2009-150947   7/2009
(Continued)

OTHER PUBLICATIONS

International Search Report of PCT application No. PCT/JP2018/004961 dated May 15, 2018.

*Primary Examiner* — Lisa S Landis
(74) *Attorney, Agent, or Firm* — Greenblum & Bernstein, P.L.C.

(57) ABSTRACT

A display device has a movable screen that is movable in a movement direction, a drive controller, a projector, and a position detector. The drive controller moves the movable screen relative to a reference position set at a prescribed position in a movement range of the movable screen. The projector performs drawing on the movable screen by irradiating the movable screen with light used for scanning the movable screen and projects a virtual image onto a target space based on light that passes through the movable screen. The position detector executes position detection processing for detecting that the movable screen is located at a detection (Continued)

position set in relation to the prescribed position. The position detector moves the movable screen and executes the position detection processing in a non-display period in which the movable screen is not irradiated with light from the projector.

16 Claims, 14 Drawing Sheets

(56) References Cited

U.S. PATENT DOCUMENTS

| | | |
|---|---|---|
| 2017/0235138 A1 | 8/2017 | Morohashi et al. |
| 2018/0017792 A1* | 1/2018 | Takazawa ............... B60K 35/00 |
| 2018/0113307 A1 | 4/2018 | Kasazumi et al. |
| 2018/0157037 A1 | 6/2018 | Kasazumi et al. |

FOREIGN PATENT DOCUMENTS

| | | |
|---|---|---|
| JP | 2010-143343 | 7/2010 |
| JP | 2013-164482 | 8/2013 |
| JP | 2015-034919 | 2/2015 |
| JP | 2015-184625 | 10/2015 |
| JP | 5930231 B | 6/2016 |
| JP | 6031741 B | 11/2016 |
| JP | 2017-015918 | 1/2017 |
| JP | 2018-106083 | 7/2018 |
| JP | 2018-106084 | 7/2018 |
| WO | 2017/002302 | 1/2017 |
| WO | 2017/002311 | 1/2017 |

* cited by examiner

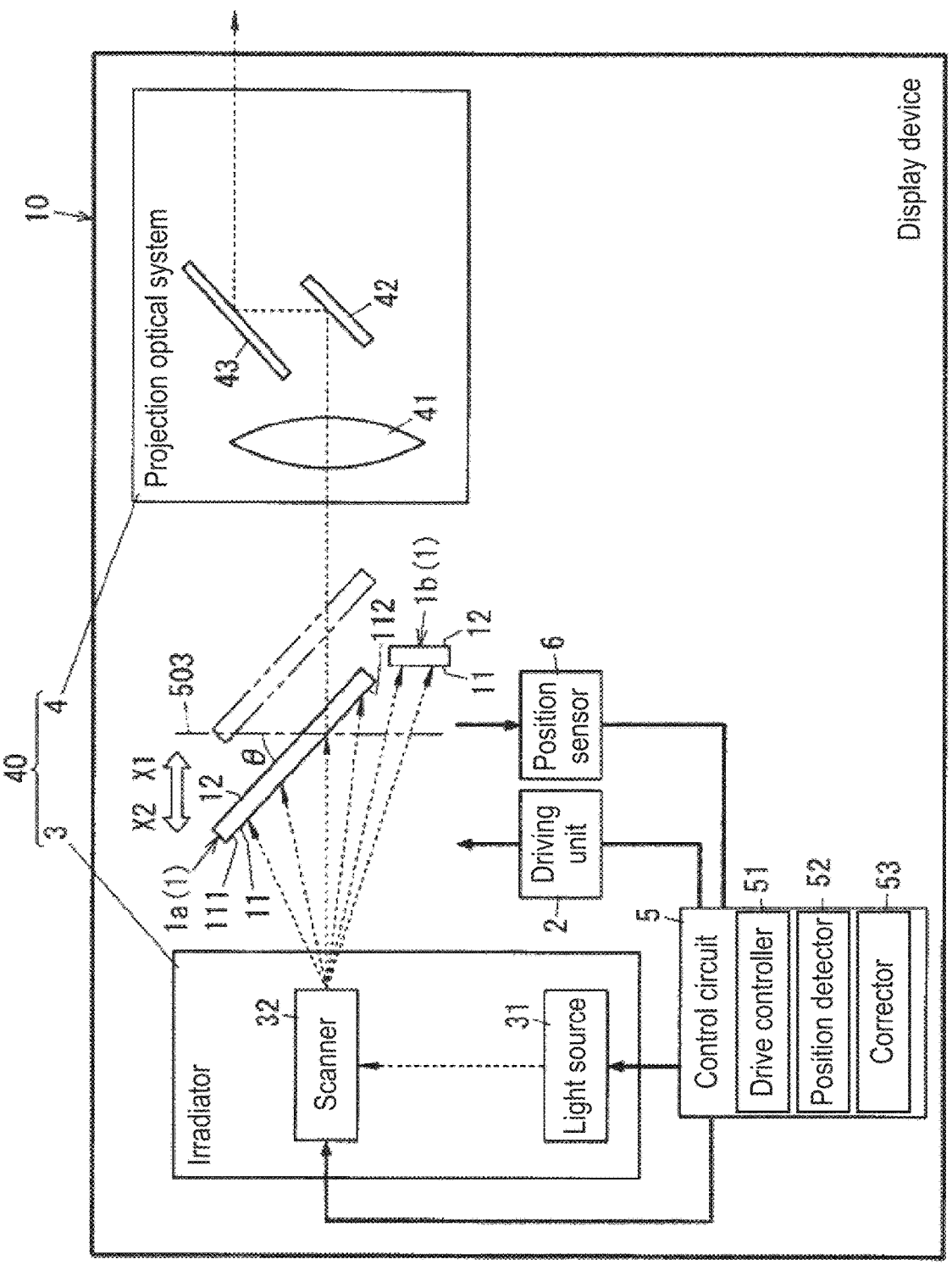

DISPLAY DEVICE, METHOD FOR CONTROLLING DISPLAY DEVICE, PROGRAM, RECORDING MEDIUM, AND MOVING BODY EQUIPPED WITH DISPLAY DEVICE

CROSS-REFERENCE TO RELATED APPLICATIONS

This application is a continuation application of the PCT International Application No. PCT/JP2018/004961 filed on Feb. 14, 2018, which claims the benefit of foreign priority of Japanese patent application No. 2017-037682 filed on Feb. 28, 2017 and Japanese patent application No. 2017-037683 filed on Feb. 28, 2017, the contents all of which are incorporated herein by reference.

BACKGROUND

1. Technical Field

The present disclosure generally relates to a display device, a method for controlling the display device, a program, a recording medium, and a moving body equipped with the display device, and more specifically relates to a display device that projects a virtual image onto a target space by using light that passes through a screen, a method for controlling the display device, a program, a recording medium, and a moving body equipped with the display device.

2. Description of the Related Art

Conventionally, a head-up display device for vehicle that displays, for example, a driving information image necessary for driving at a remote place as a virtual image through a windshield is known as a display device for vehicle (see, for example, Unexamined Japanese Patent Publication No. 2009-150947).

The display device described in Unexamined Japanese Patent Publication No. 2009-150947 has a scanner that two-dimensionally scans with light and a screen on which an image is drawn by the scanning light emitted from the scanner. Since the image formed on the screen is reflected by a windshield of a vehicle through a projector and reaches driver's eyes, the driver visually recognizes a virtual image far ahead of the windshield. According to the display device described in Unexamined Japanese Patent Publication No. 2009-150947, a distance from the driver's eyes to the virtual image can be changed by moving the screen in a direction orthogonal to a surface of the screen.

SUMMARY

In the display device described above, a position that serves as a reference (a reference position) is decided as for a position of the screen, and the screen is moved relative to this reference position. Accordingly, in a case where the reference position of the screen is displaced, there is a possibility of occurrence of variations in distance between user's (driver's) eyes and a virtual image even in a case where the display device displays a same virtual image. In particular, in a case where the reference position is deviated every time the screen is moved, an amount of deviation of the reference position is accumulated. This may undesirably increase the amount of deviation of the reference position, thereby increasing variations in distance between user's eyes and a virtual image.

The present disclosure provides a display device that can reduce a variation in distance between user's eyes and a virtual image, a method for controlling the display device, a program, a recording medium, and a moving body equipped with the display device.

A display device according to an aspect of the present disclosure has a movable screen that is movable in a movement direction, a drive controller, a projector, and a position detector. The drive controller moves the movable screen relative to a reference position set at a prescribed position in a movement range of the movable screen. The projector performs drawing on the movable screen by irradiating the movable screen with light used for scanning the movable screen and projects a virtual image onto a target space based on light that passes through the movable screen. The position detector executes position detection processing for detecting that the movable screen is located at a detection position set in relation to the prescribed position. The position detector moves the movable screen and executes the position detection processing in a non-display period in which the movable screen is not irradiated with light from the projector.

A control method according to an aspect of the present disclosure is a method for controlling a display device having a movable screen, a drive controller, a projector, and a position detector. The movable screen is movable in a movement direction. The drive controller moves the movable screen relative to a reference position set at a prescribed position in a movement range of the movable screen. The projector performs drawing on the movable screen by irradiating the movable screen with light used for scanning the movable screen and projects a virtual image onto a target space based on light that passes through the movable screen. The position detector executes position detection processing for detecting that the movable screen is located at a detection position set in relation to the prescribed position. In the control method, the movable screen is moved in a non-display period in which the movable screen is not irradiated with light from the projector, and the position detection processing is executed by the position detector in the same non-display period.

A program according to an aspect of the present disclosure is a program for causing a computer to execute the control method. A non-transitory recording medium according to an aspect of the present disclosure stores therein the program.

A moving body according to an aspect of the present disclosure includes the display device, a reflective member that reflects light from a projector, a main body that houses the display device and the reflective member, and a driving unit that moves the main body.

The present disclosure has an advantage of reducing a variation in distance from user's eyes to a virtual image.

BRIEF DESCRIPTION OF DRAWINGS

FIG. 3 is a conceptual diagram illustrating a configuration of the display device according to the first exemplary embodiment of the present disclosure.

DETAILED DESCRIPTION OF PREFERRED EMBODIMENTS

First Exemplary Embodiment (1) Outline

Figure 1:
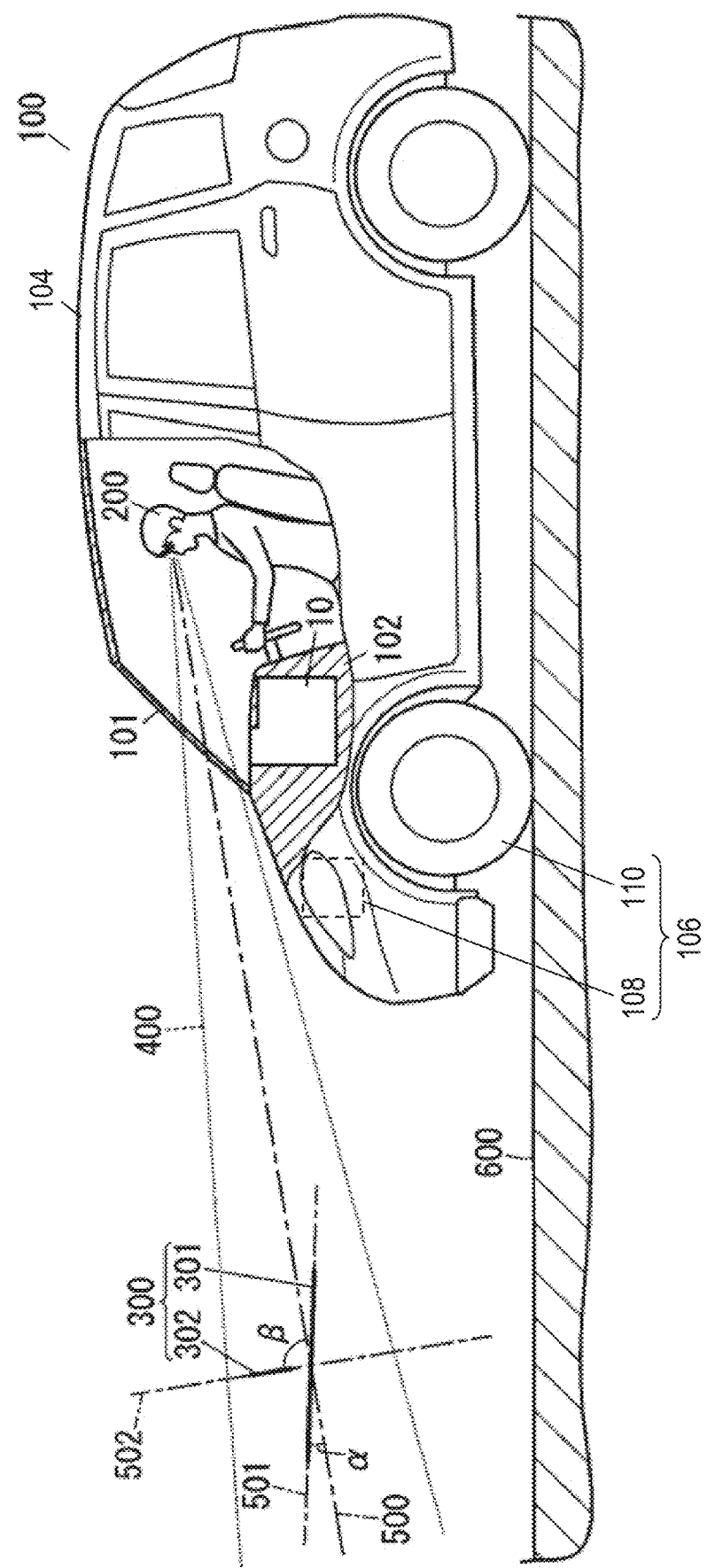
FIG. 1 is a conceptual diagram of a vehicle having a display device according to a first exemplary embodiment of the present disclosure.

As illustrated in FIG. 1, display device 10 according to the present exemplary embodiment is, for example, a head-up display (HUD) for use in vehicle 100 that is a moving body. FIG. 1 is a conceptual diagram of vehicle 100 having display device 10. Vehicle 100 has main body 104, moving body driving unit 106 that moves main body 104, display device 10 mounted in main body 104, and windshield 101 fixed to main body 104. Moving body driving unit 106 includes drive source 108 such as an engine or a motor and drive wheels 110 driven by drive source 108.

Display device 10 is installed in a cabin of vehicle 100 so as to project an image onto windshield 101 of vehicle 100 from below. In the example of FIG. 1, display device 10 is disposed in dashboard 102 below windshield 101. When an image is projected from display device 10 onto windshield 101, user 200 visually recognizes the image reflected by windshield 101 serving as a reflective member.

According to such display device 10, user 200 visually recognizes virtual image 300 projected onto target space 400 set ahead of (outside) vehicle 100 through windshield 101. The "virtual image" as used herein refers to an image formed by divergent light as if an object were actually present when light emitted from display device 10 diverges by being reflected by an object such as windshield 101. Therefore, user 200 who drives vehicle 100 can see virtual image 300 projected by display device 10 while being superimposed on an actual space expanding in front of vehicle 100. Hence, according to display device 10, various kinds of driving assistance information such as vehicle speed information, navigation information, pedestrian information, front vehicle information, lane departure information, and vehicle condition information can be displayed as virtual image 300 so that user 200 can visually recognize virtual image 300. Accordingly, user 200 can visually acquire the driving assistance information only by slightly moving his or her line of sight from the state of being directed to the front of windshield 101.

In display device 10, virtual image 300 formed in target space 400 includes at least two kinds of virtual images, i.e., first virtual image 301 and second virtual image 302. First virtual image 301 is virtual image 300 (301) formed on first virtual plane 501. First virtual plane 501 is a virtual plane whose inclination angle α with respect to optical axis 500 of display device 10 is smaller than predetermined value γ (α<γ). Furthermore, second virtual image 302 is virtual image 300 (302) formed on second virtual plane 502. Second virtual plane 502 is a virtual plane whose inclination angle β with respect to optical axis 500 of display device 10 is larger than predetermined value γ (β>γ). Optical axis 500 means an optical axis of an optical system of projection optical system 4 (see FIG. 3) that will be described later and an axis passing a center of target space 400 along an optical path of virtual image 300. Predetermined value γ is, for example, 45 degrees, and inclination angle β is, for example, 90 degrees.

Figure 2:
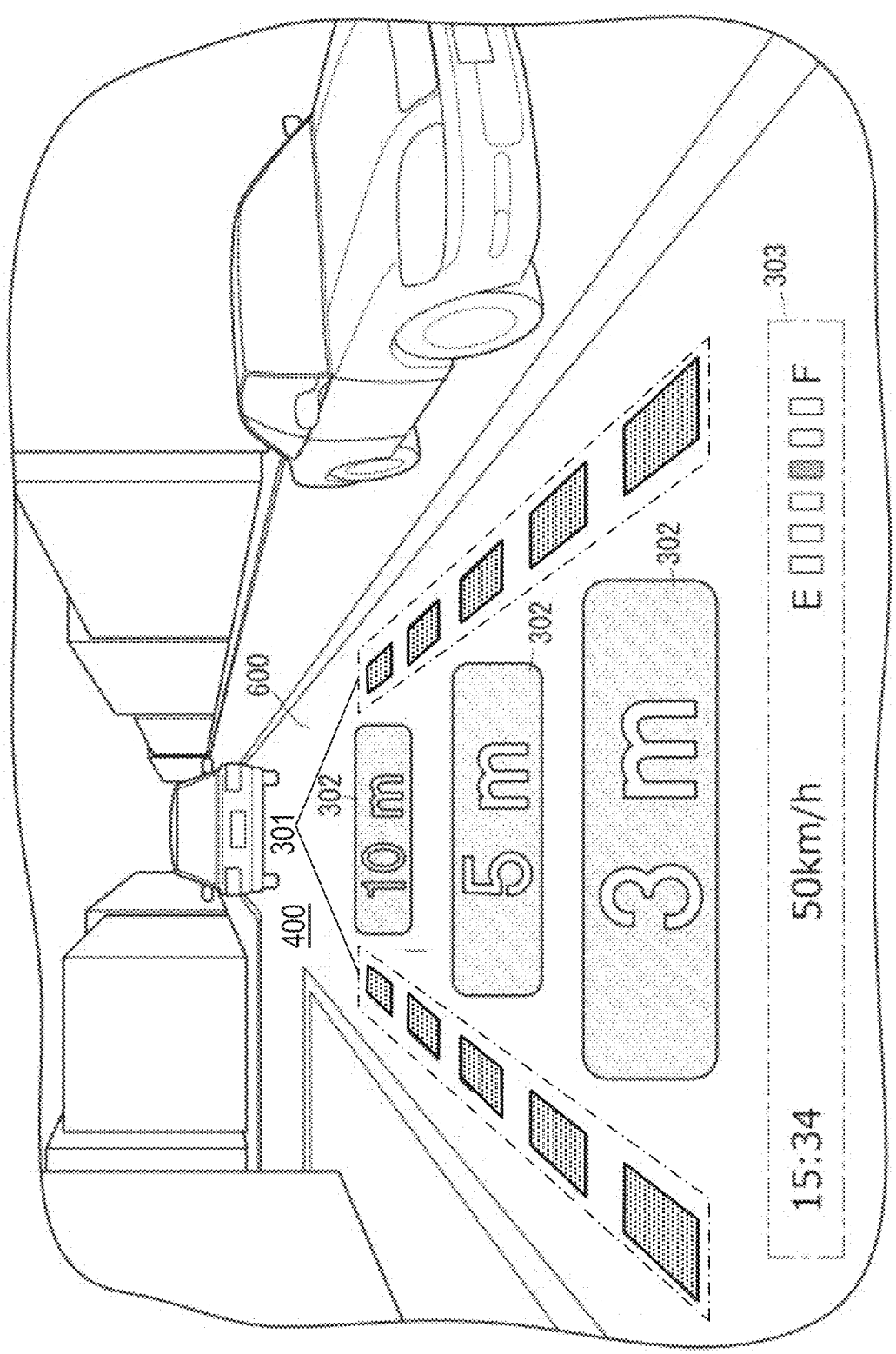
FIG. 2 is a conceptual diagram illustrating a visual field of a user in a case where the display device according to the first exemplary embodiment of the present disclosure is used.

As illustrated in FIG. 2, in display device 10, virtual image 300 formed in target space 400 includes third virtual image 303 in addition to first virtual image 301 and second virtual image 302. FIG. 2 is a conceptual diagram illustrating a visual field of user 200. Third virtual image 303 is a virtual image formed on second virtual plane 502 illustrated in FIG. 1 as in the case of second virtual image 302. In virtual image 300 formed on second virtual plane 502, a virtual image formed by light that passes through movable screen 1a illustrated in FIG. 3 is second virtual image 302. Details of this will be described later with reference to FIG. 3 and other drawings. A virtual image formed by light that passes through fixed screen 1b illustrated in FIG. 3 is third virtual image 303.

Optical axis 500 extends along road surface 600 ahead of vehicle 100 in target space 400 ahead of vehicle 100. First virtual image 301 is formed on first virtual plane 501 substantially parallel with road surface 600, and second virtual image 302 and third virtual image 303 are formed on second virtual plane 502 substantially perpendicular to road surface 600. For example, in a case where road surface 600 is a horizontal plane, first virtual image 301 is displayed along the horizontal plane, and second virtual image 302 and third virtual image 303 are displayed along a vertical plane.

As illustrated in FIG. 2, display device 10 can display first virtual image 301 viewed with depth along road surface 600 and second virtual image 302 and third virtual image 303 viewed upright on road surface 600 at a certain distance from user 200. Accordingly, user 200 sees first virtual image 301 as if first virtual image 301 is on a plane substantially parallel with road surface 600 and sees second virtual image 302 and third virtual image 303 as if second virtual image 302 and third virtual image 303 are on a plane substantially perpendicular to road surface 600. First virtual image 301 shows, for example, a direction of travelling of vehicle 100 as navigation information. Display device 10 can present, as first virtual image 301, for example, an arrow indicative of right turn or left turn on road surface 600. Second virtual image 302 shows, for example, a distance to a front vehicle or a pedestrian. Display device 10 can present, as second virtual image 302, for example, a distance (a vehicle-to-vehicle distance) to a front vehicle on the front vehicle. Third virtual image 303 shows, for example, a current time, vehicle speed information, and vehicle condition information. Display device 10 can present these pieces of information as third virtual image 303, for example, by using a text, a number, and a symbol or a meter such as a fuel meter.

(2) Configuration

FIG. 3 is a conceptual diagram illustrating a configuration of display device 10. Display device 10 has a plurality of screens 1, driving unit 2, irradiator 3, projection optical system 4, control circuit 5, and position sensor 6.

The plurality of screens 1 include fixed screen 1b and movable screen 1a. Fixed screen 1b is fixed at a predetermined position of a housing or the like of display device 10. Movable screen 1a is movable in movement direction X (a direction indicated by arrow X1-X2 in FIG. 3) with respect to the housing or the like of display device 10. That is, in a case where display device 10 is disposed in dashboard 102, fixed screen 1b is fixed at a predetermined position in dashboard 102, and movable screen 1a is movable in movement direction X in dashboard 102. Hereinafter, each of the plurality of screens 1 is sometimes referred to as screen 1 in a case where movable screen 1a and fixed screen 1b are not distinguished from each other.

Screen 1 has light transmission properties, and an image for forming virtual image 300 in target space 400 illustrated in FIG. 1 is formed on screen 1. That is, an image is drawn on screen 1 by light emitted from irradiator 3, and virtual image 300 is formed in target space 400 by light that passes through screen 1. Screen 1 is, for example, a rectangular plate-shaped member that has light diffusion properties. Screen 1 has front surface 11 and rear surface 12 on both surfaces of screen 1 in a thickness direction. In the present exemplary embodiment, for example, a large number of micro-lenses are provided on front surface 11 of screen 1. According to this structure, screen 1 has light diffusion properties on front surface 11. Screen 1 is disposed between irradiator 3 and projection optical system 4 while having a posture in which front surface 11 faces irradiator 3. That is, front surface 11 is an incident surface on which light from irradiator 3 is incident.

Front surface 11 of movable screen 1a is inclined by angle θ with respect to reference plane 503. Furthermore, movable screen 1a is movable in movement direction X orthogonal to reference plane 503. Reference plane 503 is a virtual plane that defines a movement direction of movable screen 1a and is not an actual plane. Movable screen 1a is configured to be movable rectilinearly in movement direction X while maintaining the posture in which front surface 11 is inclined by angle θ with respect to reference plane 503.

Movable screen 1a has first end part 111 and second end part 112 at both ends front surface 11 in a direction inclined with respect to reference plane 503. The direction inclined with respect to reference plane 503 is a direction parallel with front surface 11 of movable screen 1a on the paper on which FIG. 3 is drawn. A direction connecting first end part 111 and second end part 112 along front surface 11 of movable screen 1a is also referred to as a "longitudinal direction" of movable screen 1a. First end part 111 is closest to irradiator 3 on front surface 11, and second end part 112 is farthest from irradiator 3 on front surface 11. That is, movable screen 1a is configured such that a portion closer to first end part 111 in the longitudinal direction is closer to irradiator 3 and a portion closer to second end part 112 in the longitudinal direction is farther from irradiator 3.

Front surface 11 of fixed screen 1b is parallel with reference plane 503. That is, front surface 11 of fixed screen 1b is substantially orthogonal to movement direction X of movable screen 1a. Furthermore, fixed screen 1b is not movable but is fixed at a predetermined position in display device 10 unlike movable screen 1a. Fixed screen 1b is disposed adjacent to second end part 112 of movable screen 1a in the longitudinal direction of movable screen 1a. Note that a direction (an up-down direction in FIG. 3) in which fixed screen 1b and movable screen 1a are arranged along front surface 11 of fixed screen 1b is also referred to as a "longitudinal direction" of fixed screen 1b. A distance from front surface 11 of fixed screen 1b to irradiator 3 is substantially identical at both ends in the longitudinal direction of fixed screen 1b.

Driving unit 2 moves movable screen 1a in movement direction X. That is, driving unit 2 can move movable screen 1a along movement direction X in both of first direction X1 and second direction X2 that are opposite to each other. First direction X1 is rightward direction indicated by arrow "X1" in FIG. 3 and is a direction in which movable screen 1a moves away from irradiator 3, in other words, a direction in which movable screen 1a approaches projection optical system 4. Second direction X2 is a leftward direction indicated by arrow "X2" in FIG. 3 and is a direction in which movable screen 1a approaches irradiator 3, in other words, a direction in which movable screen 1a moves away from projection optical system 4. Driving unit 2, for example, includes an electric driven actuator such as a voice coil motor and operates in accordance with a first control signal from control circuit 5.

Scanning-type irradiator 3 irradiates movable screen 1a or fixed screen 1b with light. That is, irradiator 3 irradiates movable screen 1a with light used for scanning front surface 11 of movable screen 1a such that a light irradiation position on front surface 11 of movable screen 1a changes. Similarly, irradiator 3 irradiates fixed screen 1b with light used for scanning front surface 11 of fixed screen 1b such that a light irradiation position on front surface 11 of fixed screen 1b changes. Specifically, irradiator 3 has light source 31 and scanner 32. Irradiator 3 is configured such that light source 31 and scanner 32 operate in accordance with a second control signal from control circuit 5.

Light source 31 includes a laser module that outputs laser light. Light source 31 includes a red laser diode that outputs red (R) laser light, a green laser diode that outputs green (G) laser light, and a blue laser diode that outputs blue (B) laser light. The laser light beams of the three colors output from these three kinds of laser diodes are, for example, synthesized by a dichroic mirror and incident on scanner 32.

Scanner 32 irradiates movable screen 1a or fixed screen 1b with light output from light source 31 to scan front surface 11 of movable screen 1a or fixed screen 1b. Scanner 32 performs raster scan for scanning front surface 11 of movable screen 1a or fixed screen 1b two-dimensionally in the longitudinal direction and a lateral direction with light. The "lateral direction" is a direction parallel with both of front surface 11 of movable screen 1a or fixed screen 1b and reference plane 503 and is a direction orthogonal to the "longitudinal direction" on front surface 11 (a direction orthogonal to the paper on which FIG. 3 is drawn). The "lateral direction" is a direction common to movable screen 1a and fixed screen 1b.

Figure 4A:
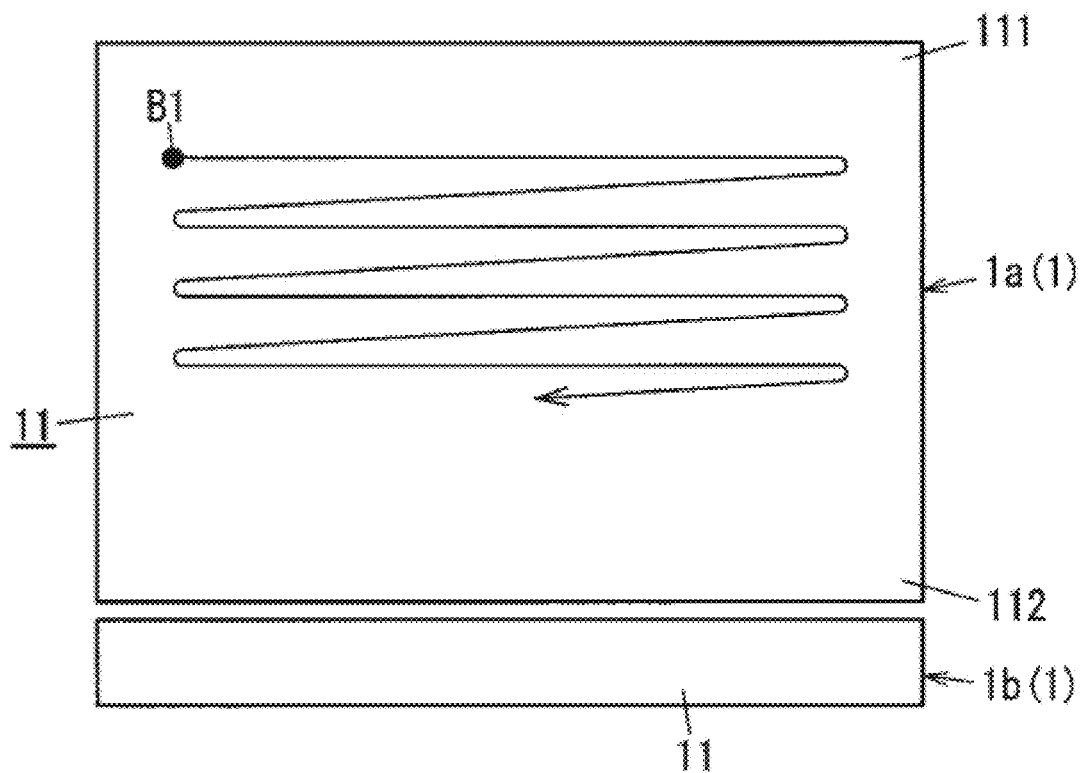
FIG. 4A is a conceptual diagram illustrating movement of a luminescent spot on a front surface of a screen in a forward path in the display device illustrated in FIG. 3.
Figure 4B:
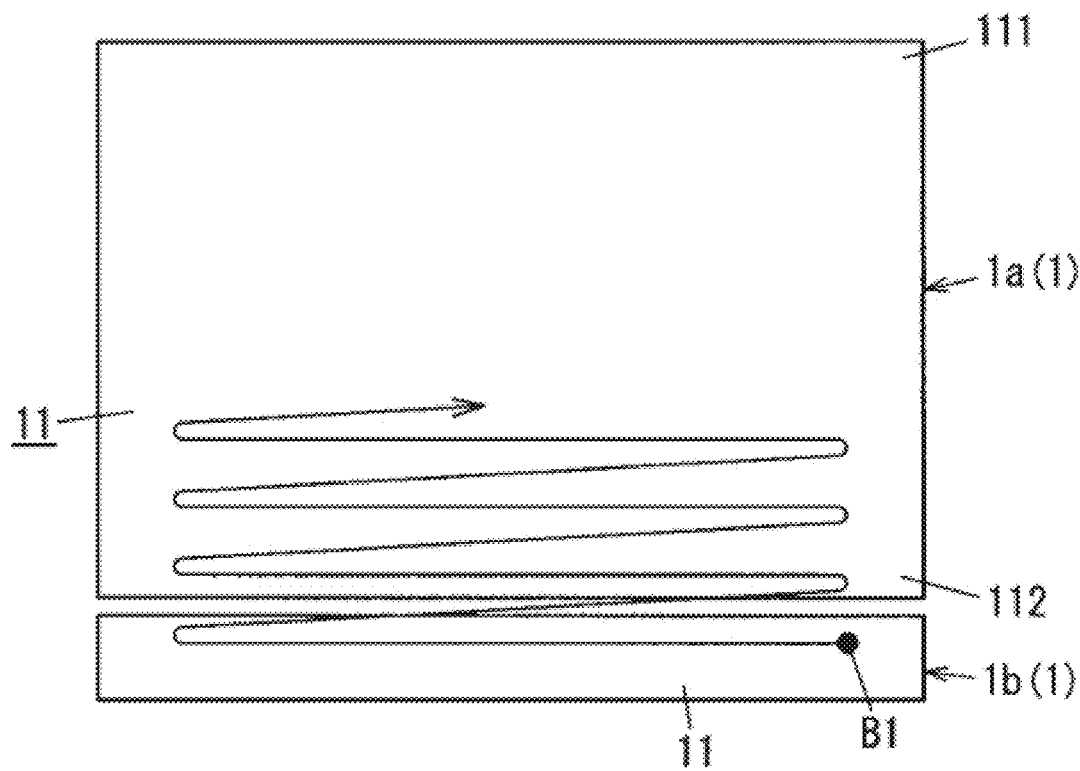
FIG. 4B is a conceptual diagram illustrating movement of a luminescent spot on the front surface of the screen in a return path in the display device illustrated in FIG. 3.

FIG. 4A is a conceptual diagram illustrating movement of luminescent spot B1 in a forward path on the front surface of screen 1 in display device 10, and FIG. 4B is a conceptual diagram illustrating movement of luminescent spot B1 in a return path on front surface 11 of screen 1. Scanner 32 forms a scanning line by performing scanning with luminescent spot B1 formed on front surface 11 of movable screen 1a or fixed screen 1b one-dimensionally in the lateral direction and forms a two-dimensional image by performing scanning with luminescent spot B1 in the longitudinal direction. Scanner 32 performs scanning with luminescent spot B1 such that luminescent spot B1 reciprocates between both ends of front surface 11 in the longitudinal direction while repeating such operation.

That is, in the present exemplary embodiment, an operation state of irradiator 3 includes a first scanning state that is the forward path and a second scanning state that is the return path. In the first scanning state, for example, irradiator 3 (scanner 32) scans front surface 11 of movable screen 1a from first end part 111 toward second end part 112. In the second scanning state, for example, irradiator 3 (scanner 32) scans front surface 11 of movable screen 1a from second end part 112 toward first end part 111.

In the present exemplary embodiment, movable screen 1a and fixed screen 1b are disposed side by side in the longitudinal direction of movable screen 1a. Accordingly, in a case where irradiator 3 is operating in the first scanning state, luminescent spot B1 that has reached second end part 112 on front surface 11 of movable screen 1a jumps from movable screen 1a to fixed screen 1b and continues to scan front surface 11 of fixed screen 1b. Similarly, in a case where irradiator 3 is operating in the second scanning state, luminescent spot B1 jumps from fixed screen 1b to movable screen 1a and continues to scan front surface 11 of movable screen 1a.

Accordingly, for example, in a case where scanner 32 reciprocates one time in the longitudinal direction starting from first end part 111 of movable screen 1a, front surface 11 of movable screen 1a is first scanned from first end part 111 toward second end part 112 with light from irradiator 3. Then, front surface 11 of fixed screen 1b is scanned with light from irradiator 3 from an end on a side closer to movable screen 1a in the longitudinal direction toward an end on a side opposite to movable screen 1a in the longitudinal direction. Then, front surface 11 of fixed screen 1b is scanned with light from irradiator 3 from the end on the side opposite to movable screen 1a in the longitudinal direction toward the end on the side closer to movable screen 1a in the longitudinal direction. Then, front surface 11 of movable screen 1a is scanned with light from irradiator 3 from second end part 112 toward first end part 111. In this way, irradiator 3 alternately scans movable screen 1a and fixed screen 1b.

Figure 5:
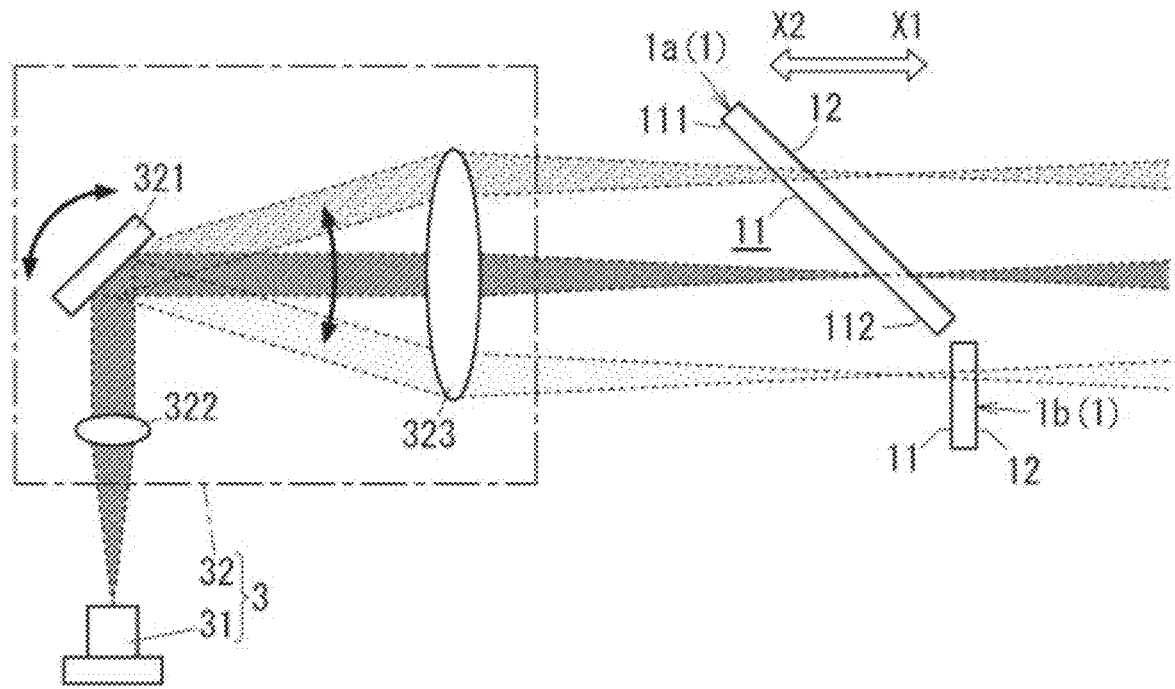
FIG. 5 is a conceptual diagram illustrating a configuration of an irradiator in the display device illustrated in FIG. 3.

FIG. 5 is a conceptual diagram illustrating a configuration of irradiator 3. Scanner 32 has, for example, a micro scanning mirror using a micro electro mechanical systems (MEMS) technology. Scanner 32 includes mirror unit 321 that reflects the laser light, and rotates mirror unit 321 to reflect the light from light source 31 in a direction according to a rotation angle (deflection angle) of mirror unit 321. This allows scanner 32 to perform scanning with the light from light source 31. Scanner 32 rotates mirror unit 321 around two axes orthogonal to each other to achieve the raster-scanning that performs two-dimensional scanning with light.

Scanner 32 further has first lens 322 and second lens 323. First lens 322 is disposed between light source 31 and mirror unit 321 and causes parallel light to be incident on mirror unit 321. Second lens 323 is a telecentric lens and is disposed between mirror unit 321 and screen 1. That is, second lens 323 is an optical system that makes a main light beam parallel with an optical axis throughout the lens. Light passing second lens 323 is output parallel with the optical axis (a straight line connecting second lens 323 and screen 1). FIG. 5 is merely a schematic view for explaining the configuration of irradiator 3, and some points in FIG. 5 are different from display device 10 according to the present exemplary embodiment. For example, a focal point of light emitted from irradiator 3 is markedly deviated from front surface 11 of screen 1.

Light that is output from irradiator 3 and passes through screen 1 is incident as incident light on projection optical system 4 illustrated in FIG. 3. Projection optical system 4 projects virtual image 300 onto target space 400 illustrated in FIG. 1 based on the incident light. Projection optical system 4 is disposed in line with screen 1 in movement direction X of movable screen 1a. Projection optical system 4 projects virtual image 300 based on light that passes through screen 1 and is output from screen 1 along movement direction X. Projection optical system 4 has magnifying lens 41, first mirror 42, and second mirror 43 as illustrated in FIG. 3.

Magnifying lens 41, first mirror 42, and second mirror 43 are arranged in this order on a path of light that has passed through screen 1. Magnifying lens 41 is disposed on an opposite side (in a side along first direction X1) of screen 1 from irradiator 3 in movement direction X so as to receive the light output from screen 1 along movement direction X. Magnifying lens 41 magnifies image 700 (see FIG. 7) formed on screen 1 by light from irradiator 3 and outputs the magnified image to first mirror 42. First mirror 42 reflects the light from magnifying lens 41 toward second mirror 43. Second mirror 43 reflects the light from first mirror 42 toward windshield 101 illustrated in FIG. 1. That is, projection optical system 4 projects virtual image 300 onto target space 400 by magnifying image 700 formed on screen 1 by light from irradiator 3 with use of magnifying lens 41 and projecting image 700 onto windshield 101. An optical axis of magnifying lens 41 serves as optical axis 500 of projection optical system 4.

Projection optical system 4 constitutes projector 40 together with irradiator 3. In other words, projector 40 has irradiator 3 and projection optical system 4. Accordingly, an optical axis (including an extended line of an optical axis reflected by a mirror and the like) of magnifying lens 41 that serves as optical axis 500 of projection optical system 4 also serves as optical axis 500 of projector 40.

Projector 40 selects, as a target screen, one screen 1 (1a or 1b) from among the plurality of screens 1. Projector 40 performs drawing on the target screen by irradiating the target screen with light used for scanning the target screen. In this way, projector 40 projects virtual image 300 onto target space 400 based on light that passes through the target screen. A direction of light from light source 31 is changed by scanner 32 of irradiator 3, and which of movable screen 1a and fixed screen 1b is irradiated with the light from light source 31 is decided by irradiator 3.

A state where movable screen 1a is irradiated with light from light source 31 by scanner 32 means that movable screen 1a is being selected as a target screen by projector 40. In this state, projector 40 performs drawing on movable screen 1a serving as a target screen by irradiating movable screen 1a with light for scanning movable screen 1a. Meanwhile, a state where fixed screen 1b is irradiated with light from light source 31 by scanner 32 means that fixed screen 1b is being selected as a target screen by projector 40. In this state, projector 40 performs drawing on fixed screen 1b serving as a target screen by irradiating fixed screen 1b with light for scanning fixed screen 1b. Since irradiator 3 alternately scans movable screen 1a and fixed screen 1b, a movable display period in which movable screen 1a is irradiated with light by projector 40 is intermittently set.

Position sensor 6 illustrated in FIG. 3 detects a position of movable screen 1a. Position sensor 6 detects an "absolute position" of movable screen 1a expressed based on a fixed member such as the housing of display device 10. The "absolute position" is a position of movable screen 1a viewed from a single point fixedly specified and is a position on absolute coordinates using this single point as an origin. Accordingly, the absolute position is unchanged unless movable screen 1a moves. Meanwhile, drive controller 51 that will be described later moves movable screen 1a relative to a reference position. The "reference position" as used herein is a position set at a prescribed position within a movement range of movable screen 1a. The "prescribed position" is any position prescribed within the movement range of movable screen 1a and is prescribed as an unchanged position on the absolute coordinates. That is, drive controller 51 moves movable screen 1a such that a "relative position" of movable screen 1a relative to this reference position is changed in a case where a certain position (absolute position) of movable screen 1a on the absolute coordinates is used as the reference position. The "relative position" is a relative position of movable screen 1a relative to any reference position on the absolute coordinates and is a position on relative coordinates using this reference position as an origin. Accordingly, even in a case where movable screen 1a does not move, the relative position changes when the reference position changes.

Position sensor 6 includes, as an example, an absolute optical encoder having a light-emitting element and a photo-receptor element. Position sensor 6 detects a position of movable screen 1a by detecting a position of a slit provided in a holder holding movable screen 1a based on a light-receiving state of light from the light-emitting element by the photo-receptor element. Note, however, that position sensor 6 is not limited to the optical encoder and may include, for example, a magnetic encoder or a contact-type sensor that detects the position based on a conduction state of a contact point.

Position sensor 6 detects a position of movable screen 1a in movement direction X of movable screen 1a. Position sensor 6 just needs to detect that movable screen 1a is located at at least a detection position and need not necessarily detect a position of movable screen 1a throughout the whole movement range of movable screen 1a. The "detection position" as used herein is a position on the absolute coordinates set in relation to the prescribed position. In the present exemplary embodiment, the prescribed position itself prescribed on the absolute coordinates is set as the detection position, and the prescribed position and the detection position match each other. Accordingly, drive controller 51 that will be described later moves movable screen 1a relative to the detection position unless the reference position is deviated from the prescribed position. Note that position sensor 6 may be capable of detecting a direction of movement and an amount of movement of movable screen 1a in movement direction X in addition to whether or not movable screen 1a is located at the detection position.

Control circuit 5 controls driving unit 2, irradiator 3, and position sensor 6. Control circuit 5 controls driving unit 2 based on a first control signal and controls irradiator 3 based on a second control signal. Specifically, control circuit 5 controls both of light source 31 and scanner 32 based on the second control signal. Furthermore, control circuit 5 receives a detection signal from position sensor 6. Control circuit 5 is configured to synchronize operation of driving unit 2 and operation of irradiator 3. Details of this will be described later.

As illustrated in FIG. 3, control circuit 5 has functions as drive controller 51, position detector 52, and corrector 53. For example, control circuit 5 decides contents of projected virtual image 300 upon receipt of a signal from a driving assistance system mounted in vehicle 100.

Drive controller 51 moves movable screen 1a relative to the reference position by controlling driving unit 2. That is, drive controller 51 moves movable screen 1a on the relative coordinates using any reference position on the absolute coordinates as an origin as described above. Drive controller 51 moves movable screen 1a in order to project second virtual image 302 onto target space 400 based on light that passes through movable screen 1a. Details of this will be described later. Drive controller 51 controls driving unit 2 in synchronization with drawing on movable screen 1a by irradiator 3.

Drive controller 51 controls driving unit 2 so as to intermittently move movable screen 1a. Drive controller 51 performs return processing for moving movable screen 1a such that movable screen 1a returns to the reference position every time movable screen 1a is moved. In this way, drive controller 51 moves movable screen 1a relative to reference position while performing open-loop control of driving unit 2.

Note, however, that there is a possibility of occurrence of a variation in position (absolute position) of movable screen 1a after the return processing. That is, there is a possibility that the position of movable screen 1a on the absolute coordinates is displaced every time movable screen 1a moves, and as a result, a variation in reference position on the absolute coordinates occurs. Display device 10 has position detector 52 and corrector 53, and thus reduces such a variation in reference position.

Position detector 52 detects that movable screen 1a is located at the detection position set in relation to the prescribed position. That is, position detector 52 executes position detection processing. More specifically, position detector 52 is configured to move movable screen 1a and execute the position detection processing in a non-display period in which movable screen 1a is not irradiated with light from projector 40 (projection optical system 4 and irradiator 3). In other words, position detector 52 is configured to move movable screen 1a and execute the position detection processing in a fixed display period in which fixed screen 1b is being selected as a target screen by projector 40 (projection optical system 4 and irradiator 3). As described above, position detector 52 has a function of moving movable screen 1a on the absolute coordinates by controlling driving unit 2. Position detector 52 moves movable screen 1a such that movable screen 1a passes the detection position in the non-display period (fixed display period) and detects that movable screen 1a is located at the detection position during this period. Details of this will be described later.

Corrector 53 moves movable screen 1a to the prescribed position based on at least a detection result of position detector 52. That is, corrector 53 has a function of moving movable screen 1a on the absolute coordinates by controlling driving unit 2. With this configuration, even in a case where a variation occurs in reference position on the absolute coordinates, the reference position is set again on the prescribed position by position detector 52 and corrector 53 such that the reference position matches the prescribed position. Corrector 53 is configured to move movable screen 1a to the prescribed position based on the detection result of position detector 52 and an amount of movement of movable screen 1a after passage through the detection position. Details of this will be described later.

Control circuit 5 is constituted by a microcomputer mainly including, for example, a central processing unit (CPU) and a memory. In other words, controller 5 is implemented by a computer including the CPU and the memory. The CPU executes a program stored in the memory, allowing the computer to function as control circuit 5 (drive controller 51, position detector 52, and corrector 53). Herein, the program is recorded in the memory of control circuit 5 in advance. However, the program may be provided via a telecommunication line such as the Internet or by being recorded in various kinds of discs or a non-transitory recording medium such as a memory card. Control circuit 5 may be constituted by a dedicated circuit instead of being constituted by a general-purpose CPU and a program stored in a memory.

(3) Operation (3.1) Basic Operation

Figure 6:
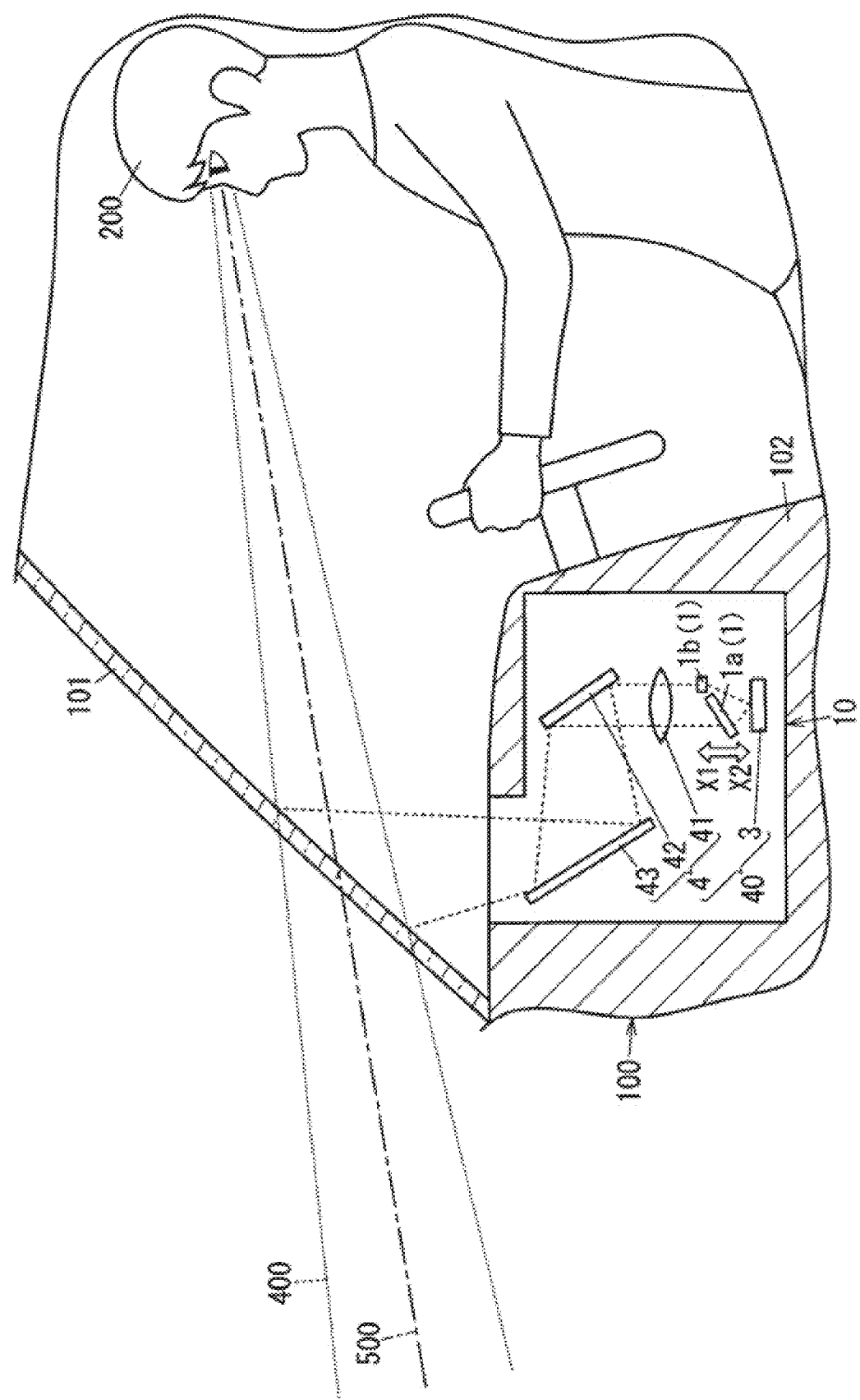
FIG. 6 is a conceptual diagram for explaining an operation of the display device illustrated in FIG. 3.

Next, basic operation of display device 10 will be described with reference to FIG. 6.

Control circuit 5 controls irradiator 3 to irradiate movable screen 1a with light from irradiator 3. At this moment, irradiator 3 irradiates movable screen 1a with light used for scanning front surface 11 of movable screen 1a. With this configuration, image 700 (see FIG. 7) is formed (projected) on front surface 11 or rear surface 12 of movable screen 1a. In the present exemplary embodiment, as an example, front surface 11 of movable screen 1a has light-diffusing properties, thereby forming image 700 on front surface 11 of movable screen 1a.

Furthermore, the light from irradiator 3 passes through movable screen 1a, and windshield 101 is irradiated with light from projection optical system 4 (magnifying lens 41, first mirror 42, and second mirror 43). In this manner, image 700 formed on movable screen 1a is projected onto windshield 101 from below windshield 101 in the cabin of vehicle 100.

When image 700 is projected from projection optical system 4 onto windshield 101, windshield 101 reflects the light from projection optical system 4 toward user 200 in the cabin. This allows user 200 to visually recognize image 700 reflected by windshield 101. As a result, user 200 visually recognizes virtual image 300 (first virtual image 301 or second virtual image 302) projected onto the area ahead of (outside) vehicle 100 through windshield 101.

Furthermore, control circuit 5 causes drive controller 51 to control driving unit 2 such that movable screen 1a moves in movement direction X in a movable display period in which movable screen 1a is being selected as a target screen by projector 40 (projection optical system 4 and irradiator 3). In a case where an irradiation position of light from irradiator 3 on front surface 11 of movable screen 1a, that is, a position of luminescent spot B1 is constant, when movable screen 1a moves toward first direction X1, a distance from eyes (eye point) of user 200 to virtual image 300 becomes shorter. Hereinafter, this distance is also referred to as a "viewing distance". In contrast, in a case where the position of luminescent spot B1 on front surface 11 of movable screen 1a is constant, when movable screen 1a moves toward second direction X2, the visual distance to virtual image 300 becomes longer. In short, the viewing distance to virtual image 300 changes according to a position of movable screen 1a in movement direction X. With movable screen 1a being closer to irradiator 3, the viewing distance to virtual image 300 projected corresponding to luminescent spot B1 on movable screen 1a becomes longer. In other words, with the irradiation position of the light from irradiator 3 on movable screen 1a becoming farther from projection optical system 4 in movement direction X, the viewing distance to virtual image 300 projected by this light becomes longer.

Control circuit 5 controls irradiator 3 to irradiate fixed screen 1b with light from irradiator 3. At this moment, irradiator 3 irradiates fixed screen 1b with light used for scanning front surface 11 of fixed screen 1b. Therefore, similarly to a case that movable screen 1a is irradiated with light, an image is formed on front surface 11 (or rear surface 12) of fixed screen 1b and the image is projected onto windshield 101. As a result, user 200 visually recognizes virtual image 300 (third virtual image 303) projected onto the area ahead of (outside) vehicle 100 through windshield 101.

(3.2) Specific Display Operation

Figure 7:
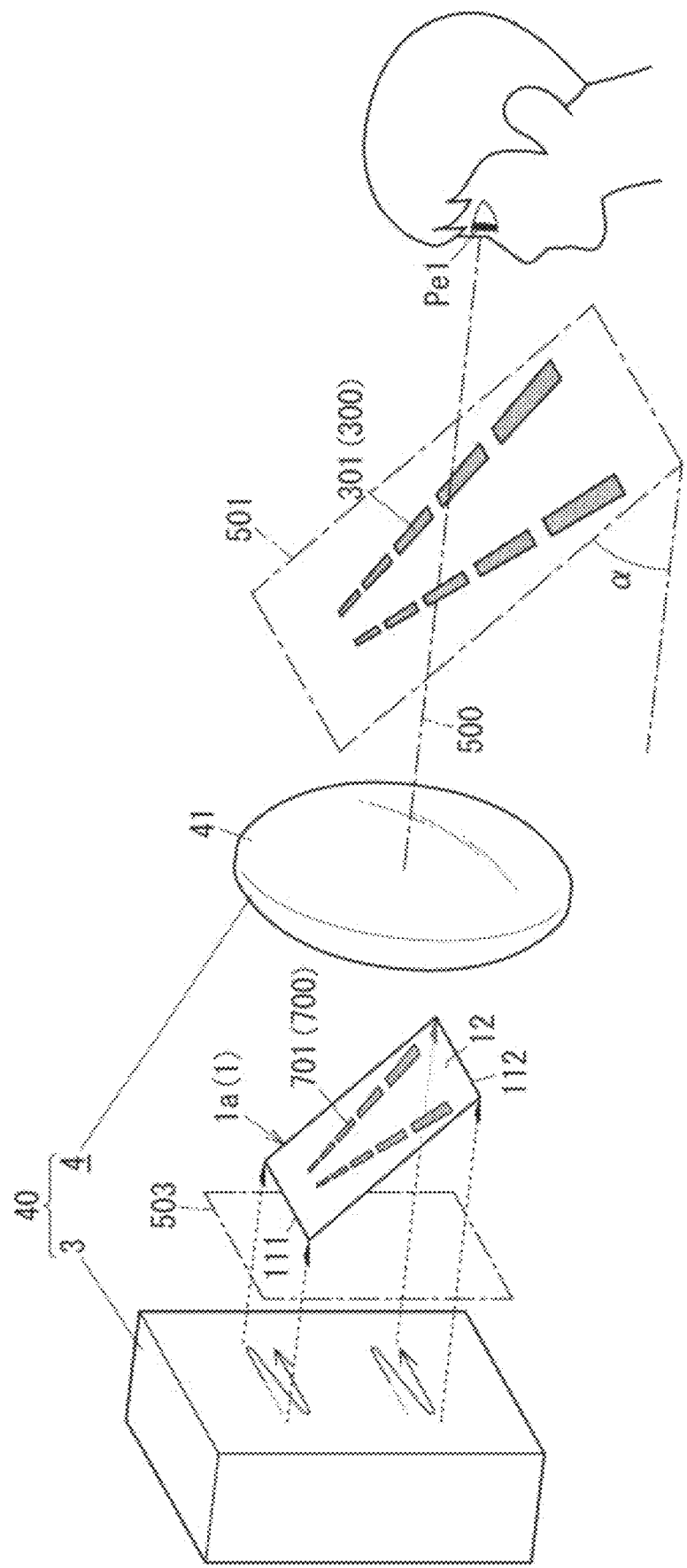
FIG. 7 is an explanatory view schematically illustrating an operation for projecting a first virtual image in the display device illustrated in FIG. 3.
Figure 8:
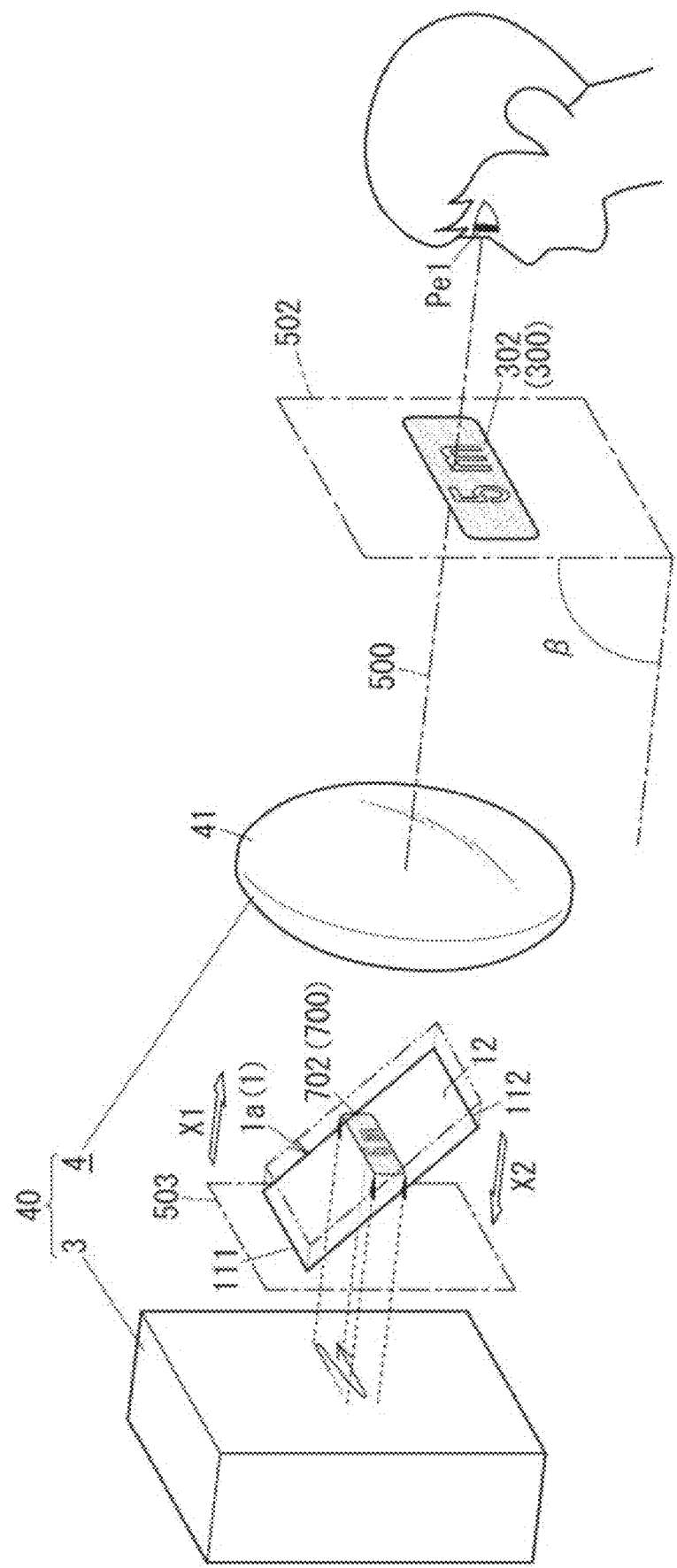
FIG. 8 is an explanatory view schematically illustrating an operation for projecting a second virtual image in the display device illustrated in FIG. 3.

Next, specific operation for projecting virtual image 300 in display device 10 is described with reference to FIGS. 7 and 8. FIG. 7 is a schematic diagram illustrating an operation of display device 10 for projecting first virtual image 301. FIG. 8 is a schematic diagram illustrating an operation of display device 10 for projecting second virtual image 302. In FIGS. 7 and 8, members such as fixed screen 1b are omitted.

As illustrated in FIG. 7, control circuit 5 controls irradiator 3 to irradiate movable screen 1a with light in a case where first virtual image 301 is projected. In this case, control circuit 5 fixes movable screen 1a in movement direction X without moving movable screen 1a in movement direction X (see FIG. 6). That is, control circuit 5 controls driving unit 2 and irradiator 3 to irradiate movable screen 1a at the fixed position with light. As described above, movable screen 1a is inclined with respect to movement direction X. Accordingly, even when movable screen 1a is located at the fixed position, a distance to projection optical system 4 in movement direction X varies depending on a position on front surface 11 of movable screen 1a in the longitudinal direction. Therefore, even when movable screen 1a is fixed, when the irradiation position of the light from irradiator 3 on front surface 11 of movable screen 1a changes in the longitudinal direction, the irradiation position of the light from irradiator 3 on front surface 11 of movable screen 1a changes in movement direction X. As a result, first image 701 is formed on movable screen 1a. First image 701 is image 700 formed on front surface 11 (or rear surface 12) of movable screen 1a, which is formed along front surface 11 of movable screen 1a, that is, is inclined with respect to reference plane 503. When first image 701 is projected onto windshield 101 from projection optical system 4, user 200 visually recognizes first virtual image 301 projected in front of vehicle 100 through windshield 101.

For example, when the irradiation position of the light from irradiator 3 on front surface 11 of movable screen 1a becomes closer to first end part 111 in the longitudinal direction, the distance from projection optical system 4 to the irradiation position in movement direction X becomes longer. Accordingly, the viewing distance to virtual image 300 projected by this light becomes longer. In contrast, when the irradiation position of the light from irradiator 3 on front surface 11 of movable screen 1a becomes closer to second end part 112 in the longitudinal direction, the distance from projection optical system 4 to the irradiation position in movement direction X becomes shorter. Accordingly, the viewing distance to virtual image 300 projected by this light becomes shorter. With this configuration, first virtual image 301 serving as virtual image 300 is formed on first virtual plane 501 inclined at inclination angle α with respect to optical axis 500.

Accordingly, when irradiator 3 scans movable screen 1a with light, for example, from first end part 111 toward second end part 112 in a state where movable screen 1a is fixed, first virtual image 301 is projected. First virtual image 301 is visually recognized by user 200 with depth along road surface 600. As illustrated in FIG. 7, the viewing distance from eye point Pe1 to first virtual image 301 formed in this case becomes larger at first end part 111 (an upper end part) of movable screen 1a than at second end part 112 (a lower end part) of movable screen 1a. In other words, movable screen 1a is configured such that, when first end part 111 is irradiated with the light of irradiator 3, an optical path length from a drawing point on first virtual image 301 to projection optical system 4 is maximized. Movable screen 1a is configured such that, when second end part 112 is irradiated with the light of irradiator 3, the optical path length from the drawing point on first virtual image 301 to projection optical system 4 is minimized. In other words, first virtual image 301 is designed to be a virtual image inclined with respect to optical axis 500 such that the viewing distance is maximized on the upper end side in an up-down direction (the up-down direction in FIG. 2) when viewed from user 200.

Meanwhile, as illustrated in FIG. 8, control circuit 5 moves movable screen 1a in movement direction X while controlling irradiator 3 to irradiate movable screen 1a with light in a case where second virtual image 302 is projected. That is, control circuit 5 controls driving unit 2 and irradiator 3 to irradiate movable screen 1a that is moving with light. As described above, since movable screen 1a is inclined with respect to movement direction X, when movable screen 1a is located at the fixed position, a distance to projection optical system 4 in movement direction X varies depending on a position on front surface 11 of movable screen 1a in the longitudinal direction. When movable screen 1a is moved in movement direction X in synchronization with a change in irradiation position of the light from irradiator 3 in the longitudinal direction so as to cancel the difference in distance, the irradiation position of the light from irradiator 3 on front surface 11 in movable screen 1a is unchanged in movement direction X. As a result, second image 702 is formed (projected) on movable screen 1a. Second image 702 is image 700 formed on front surface 11 (or rear surface 12) of movable screen 1a, which is formed along reference plane 503. When second image 702 is projected onto windshield 101 from projection optical system 4, user 200 visually recognizes second virtual image 302 projected in front of vehicle 100 through windshield 101.

For example, it is assumed that an irradiation position of light from irradiator 3 on front surface 11 of movable screen 1a becomes closer to first end part 111 in the longitudinal direction. In this case, when movable screen 1a moves in first direction X1, a distance from projection optical system 4 to the irradiation position in movement direction X becomes substantially constant. In contrast, it is assumed that an irradiation position of light from irradiator 3 on front surface 11 of movable screen 1a becomes closer to second end part 112 in the longitudinal direction. In this case, when movable screen 1a moves in second direction X2, a distance from projection optical system 4 to the irradiation position in movement direction X becomes substantially constant. With this configuration, second virtual image 302 serving as virtual image 300 is formed on second virtual plane 502 inclined at inclination angle β (for example, 90 degrees) with respect to optical axis 500.

Accordingly, for example, when irradiator 3 irradiates movable screen 1a moving along second direction X2 with light from first end part 111 toward second end part 112, second virtual image 302 that is visually recognized as being erected upright on road surface 600 at a certain distance from user 200 is projected. As illustrated in FIG. 8, the viewing distance from eye point Pe1 to second virtual image 302 formed in this case becomes substantially equal at first end part 111 (an upper end part) of movable screen 1a and at second end part 112 (a lower end part) of movable screen 1a. In other words, when viewed from user 200, second virtual image 302 becomes a virtual image whose viewing distance is substantially equal at the upper end and the lower end in the up-down direction (the up-down direction in FIG. 2).

Note that a scanning range of irradiator 3 in the longitudinal direction is set narrower when second virtual image 302 is formed than when first virtual image 301 is formed. In other words, as for image 700 formed on front surface 11 of movable screen 1a, a dimension in the longitudinal direction of second image 702 is smaller than that of first image 701. With this configuration, for example, as illustrated in FIG. 2, a dimension of each second virtual image 302 in the up-down direction becomes smaller than a dimension of first virtual image 301 in the up-down direction in the view field of user 200.

Control circuit 5 controls irradiator 3 to irradiate fixed screen 1b with light in a case where third virtual image 303 is projected. Fixed screen 1b is substantially orthogonal to movement direction X with respect to movement direction X. Accordingly, a distance in movement direction X from front surface 11 of fixed screen 1b to projection optical system 4 is substantially constant irrespective of a position on front surface 11 of fixed screen 1b in the longitudinal direction. As a result, a third image is formed on fixed screen 1b along reference plane 503. When this third image is projected onto windshield 101 from projection optical system 4, user 200 visually recognizes third virtual image 303 projected in front of vehicle 100 through windshield 101. Third virtual image 303 formed by light that passes through fixed screen 1b is formed on second virtual plane 502 inclined at inclination angle β (e.g., 90 degrees) with respect to optical axis 500 as in the case of second virtual image 302. In other words, when viewed from user 200, third virtual image 303 becomes a virtual image whose viewing distance is substantially equal at the upper end and the lower end in the up-down direction (the up-down direction in FIG. 2).

Display device 10 can project all of first virtual image 301, second virtual image 302, and third virtual image 303 during a single cycle in which scanner 32 reciprocates one time in the longitudinal direction of movable screen 1a. The following describes, as an example, a case where first virtual image 301, third virtual image 303, and second virtual image 302 are projected in this order in a case where scanner 32 reciprocates one time in the longitudinal direction starting from first end part 111 of movable screen 1a. Specifically, in the "forward path" where scanning is performed with light from first end part 111 toward second end part 112, projector 40 first irradiates movable screen 1a with light to project first virtual image 301, and then irradiates fixed screen 1b with light to display third virtual image 303. Then, in the "return path" where scanning is performed with light from second end part 112 toward first end part 111, projector 40 first irradiates fixed screen 1b with light to display third virtual image 303 and then irradiates movable screen 1a with light to project second virtual image 302.

That is, when starting a display operation (projection of virtual image 300), display device 10 first performs processing for forming first virtual image 301 in the "forward path". That is, control circuit 5 draws first image 701 by causing irradiator 3 to operate in the first scanning state and scan (raster scan) front surface 11 of movable screen 1a from first end part 111 toward second end part 112. In this case, control circuit 5 causes drive controller 51 to control driving unit 2 such that movable screen 1a is fixed at the reference position. In this way, in the "forward path", first, first image 701 is drawn on movable screen 1a in a state where movable screen 1a is fixed at the reference position. Accordingly, first virtual image 301 is projected onto target space 400 along road surface 600 in the "forward path" in the movable display period in which movable screen 1a is being selected as a target screen by projector 40.

Next, in the forward path", display device 10 performs processing for forming third virtual image 303. That is, control circuit 5 causes irradiator 3 to operate in the first scanning state and scan (raster scan) front surface 11 of fixed screen 1b from an end closest to movable screen 1a toward an end on a side opposite to movable screen 1a. In this way, a third image is drawn. When the forward path is terminated, display device 10 continues to perform processing for forming (projecting) third virtual image 303 in the "return path". That is, control circuit 5 draws the third image by causing irradiator 3 to operate in the second scanning state and scan front surface 11 of fixed screen 1b from the end on the side opposite to movable screen 1a toward the end closest to movable screen 1a. In this way, in the fixed display period in which fixed screen 1b is being selected as a target screen by projector 40, the third image is drawn on fixed screen 1b in both of the "forward path" and the "return path". Accordingly, in the fixed display period, third virtual image 303 erected upright on road surface 600 at a certain distance from user 200 is projected onto target space 400 irrespective of the "forward path" or the "return path".

Next, in the return path", display device 10 performs processing for forming second virtual image 302. That is, control circuit 5 draws second image 702 by causing irradiator 3 to operate in the second scanning state and scan (raster scan) front surface 11 of movable screen 1a from second end part 112 toward first end part 111. In this case, control circuit 5 causes drive controller 51 to control driving unit 2 such that movable screen 1a moves in first direction X1. During a period in which second image 702 is being drawn, a movement speed of movable screen 1a moving along first direction X1 is constant at a prescribed speed. In other words, in the "return path", second image 702 is drawn while moving movable screen 1a away from irradiator 3 toward projection optical system 4 each time one scan line is drawn on movable screen 1a along the lateral direction. Accordingly, second virtual image 302 erected upright on road surface 600 at a certain distance from user 200 is projected onto target space 400 in the "return path" and in the movable display period in which movable screen 1a is being selected as a target screen by projector 40.

As a result, during a period in which the irradiation position of the light from irradiator 3 reciprocates one time in the longitudinal direction on front surfaces 11 of movable screen 1a and fixed screen 1b, first virtual image 301, third virtual image 303, and second virtual image 302 are projected onto target space 400. Scanning in the longitudinal direction is performed in irradiator 3 relatively fast, so that user 200 views as if first virtual image 301, third virtual image 303, and second virtual image 302 were displayed simultaneously. A frequency of scanning in the longitudinal direction in irradiator 3 is, for example, not less than 60 Hz.

(3.3) Position Detection Processing

Next, operation of position detector 52 and corrector 53 for reducing a variation in reference position in display device 10 is described with reference to FIGS. 9A through 9C. In the following description, it is assumed that first virtual image 301, third virtual image 303, and second virtual image 302 are projected in this order while scanner 32 reciprocates one time in the longitudinal direction, as described in "(3.2) Specific display operation".

Figure 9A:
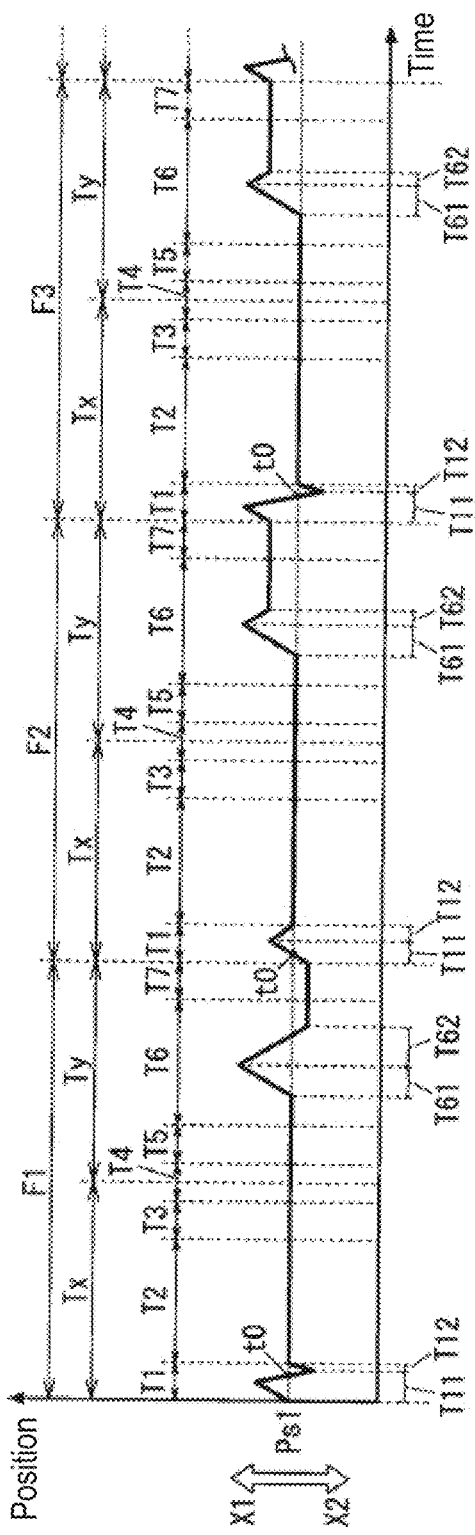
FIG. 9A is a graph illustrating a temporal change of a position of the screen in the display device illustrated in FIG. 3.
Figure 9B:
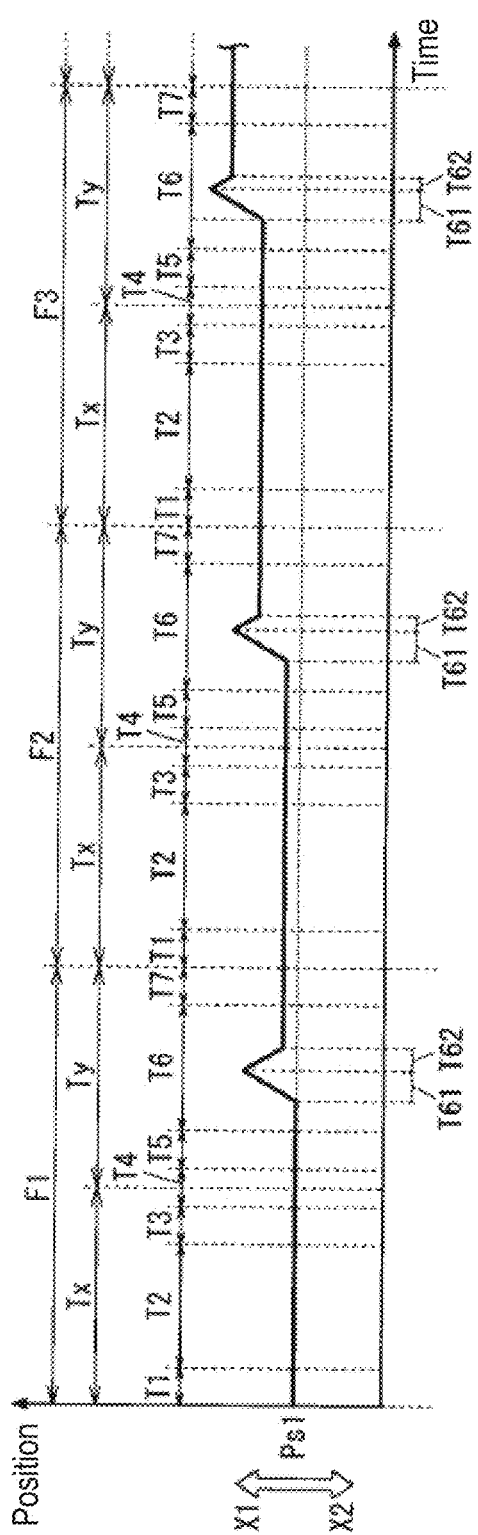
FIG. 9B is a graph illustrating a temporal change of a position of a screen in a comparative example.
Figure 9C:
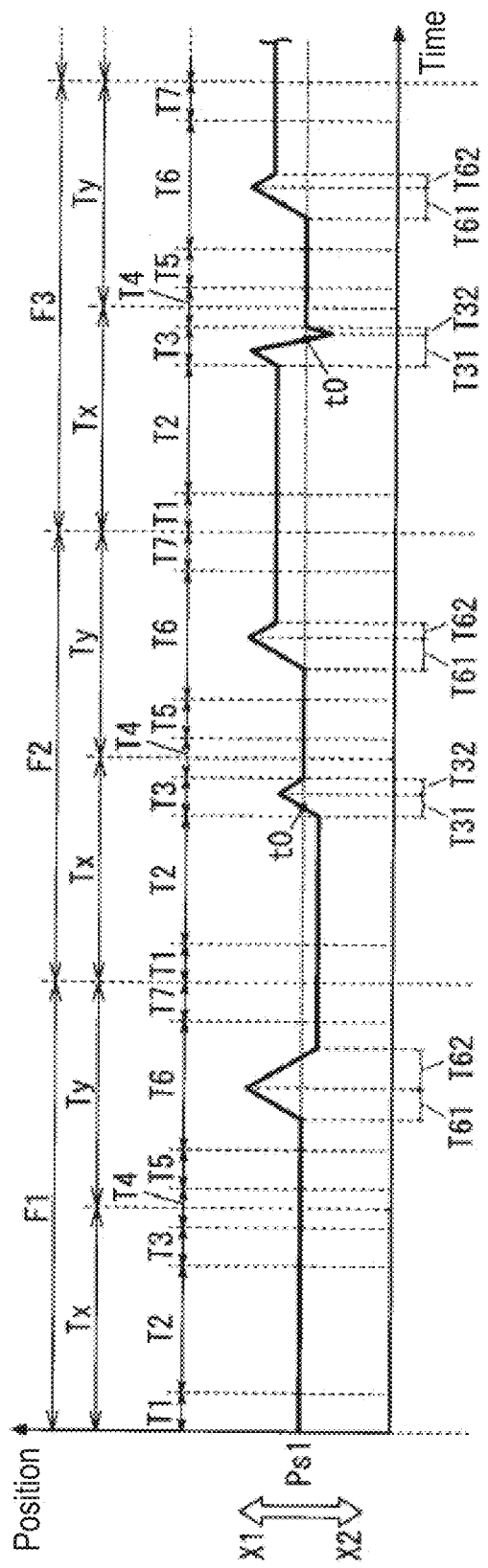
FIG. 9C is another graph illustrating a temporal change of a position of the screen in the display device illustrated in FIG. 3.

FIGS. 9A and 9C are graphs illustrating a temporal change of a position of movable screen 1a in movement direction X when display device 10 operates. FIG. 9B is a similar graph of a comparative example in which position detector 52 and corrector 53 are omitted. In FIGS. 9A through 9C, a horizontal axis is a time axis, and the position of movable screen 1a is indicated along a vertical axis.

In display device 10, each frame F1, F2, or F3 corresponding to a single cycle in which scanner 32 reciprocates one time in the longitudinal direction of movable screen 1a is divided into first through seventh periods T1 through T7, as illustrated in FIGS. 9A and 9C. In a case where a start time of the "forward path" is a start point of each frame F1, F2, or F3, first period T1, second period T2, third period T3, fourth period T4, fifth period T5, sixth period T6, and seventh period T7 are set in this order from the start point of each frame F1, F2, or F3. First period T1, fourth period T4, and seventh period T7 are blanking periods in which irradiator 3 does not irradiate any of the plurality of screens 1 with light. During the blanking periods, irradiator 3 does not irradiate any of movable screen 1a and fixed screen 1b with light. The blanking periods are set, for example, when a rotation direction of mirror unit 321 in scanner 32 in the longitudinal direction is reversed (i.e., when the forward path and the return path are switched). Second period T2 is a period for projecting first virtual image 301. Third period T3 and fifth period T5 are fixed display periods for projecting third virtual image 303. Sixth period T6 is a movable display period for projecting second virtual image 302. Switching from the "forward path" to the "return path" is performed in the middle of fourth period T4 (non-display period). That is, in the present exemplary embodiment, first virtual image 301 and third virtual image 303 are projected in this order in period Tx of the "forward path", and third virtual image 303 and second virtual image 302 are projected in this order in period Ty of the "return path".

In the example of FIG. 9A, it is assumed that a "reference position" that serves as a reference of movement of movable screen 1a by drive controller 51 matches prescribed position Ps1 at the start point of frame F1. During first period T1 that is a non-display period of frame F1, position detection processing (period T11) and correcting processing (period T12) are executed as in frames F2 and F3. This will be described later. Movable screen 1a is located at prescribed position Ps1 at an end point of the correcting processing (at an end point of period T12). Accordingly, after an end point of first period T1 in period Tx of the "forward path" of frame F1, movable screen 1a is fixed at the reference position (prescribed position Ps1). In other words, during second period T2 in period Tx of the "forward path", with movable screen 1a being fixed at the reference position, first image 701 is formed on movable screen 1a, thereby projecting first virtual image 301 onto target space 400.

On the other hand, in period Ty of the "return path" of frame F1, the position of movable screen 1a in movement direction X is changed in synchronization with timing when second image 702 is drawn. In FIG. 9A, period T61 in sixth period T6 (movable display period) is a period in which second image 702 is being drawn. In other words, with movable screen 1a being moved from reference position (prescribed position Ps1) in first direction X1, second image 702 is formed on movable screen 1a, thereby projecting second virtual image 302 onto target space 400. At this time, a moving speed of movable screen 1a is constant. Each time second image 702 is formed, movable screen 1a is moved along second direction X2 to return to the reference position in period T62 immediately after period T61. In the example of FIG. 9A, it is assumed that the reference position after the return is slightly deviated in second direction X2 from prescribed position Ps1 on the absolute coordinates. Accordingly, at an end point of frame F1 (at the start point of frame F2), movable screen 1a is at a position deviated from prescribed position Ps1.

In display device 10, position detector 52 moves movable screen 1a and executes the position detection processing in first period T1 (non-display period) of frame F2. In FIG. 9A, period T11 in first period T1 is a period in which the position detection processing is executed. In this case, position detector 52 moves movable screen 1a such that movable screen 1a passes a detection position (prescribed position Ps1) by moving movable screen 1a at prescribed amplitude in movement direction X. Then, position detector 52 detects that movable screen 1a is located at the detection position at a moment when movable screen 1a passes the detection position (prescribed position Ps1). That is, in the example of FIG. 9A, position detector 52 detects that movable screen 1a is located at the detection position at time t0 at which movable screen 1a passes prescribed position Ps1.

Position detector 52 is configured to move movable screen 1a in a control pattern different from drive controller 51 in a non-display period. That is, drive controller 51 moves movable screen 1a in order to achieve projection of second virtual image 302. Accordingly, drive controller 51 moves movable screen 1a at a prescribed speed in a predetermined direction (first direction X1) by synchronizing operation of driving unit 2 with operation of irradiator 3 as in period T61 of sixth period T6. Meanwhile, position detector 52 moves movable screen 1a in a non-display period irrespective of projection of virtual image 300. Accordingly, position detector 52 can move movable screen 1a in a control pattern (a direction and speed of movement) different from drive controller 51.

Furthermore, in first period T1 (non-display period) of frame F2, corrector 53 executes correcting processing for moving movable screen 1a to prescribed position Ps1 based on a detection result of position detector 52. Period T12 in first period T1 is a period in which the correcting processing is executed. In this case, corrector 53 moves movable screen 1a to prescribed position Ps1 by moving movable screen 1a in movement direction X based on the detection result of position detector 52 and an amount of movement of movable screen 1a after passage through the detection position. That is, corrector 53 corrects the reference position by moving movable screen 1a to prescribed position Ps1 that is a legitimate reference position on the absolute coordinates based on the detection result of position detector 52.

Specifically, corrector 53 detects a direction and an amount of movement of movable screen 1a from time t0 at which position detector 52 detects that movable screen 1a is located at the detection position, for example, based on an output of position sensor 6. Corrector 53 moves movable screen 1a to the legitimate reference position (prescribed position Ps1) by moving movable screen 1a toward a side opposite to the detected direction of movement by the amount of movement thus detected. In the example of FIG. 9A, in frame F2, corrector 53 moves movable screen 1a in second direction X2 since movable screen 1a has moved in first direction X1 from time to. Accordingly, the position of movable screen 1a is at the legitimate reference position (prescribed position Ps1) at the end point of first period T1 (the start point of second period T2) of frame F2.

Accordingly, after the start point of second period T2 in period Tx of the "forward path" of frame F2, movable screen 1a is fixed at the legitimate reference position (prescribed position Ps1). In other words, during second period T2, with movable screen 1a being fixed at prescribed position Ps1, first image 701 is formed on movable screen 1a, thereby projecting first virtual image 301 onto target space 400.

During period Ty of the "return path" of frame F2, movable screen 1a moves in periods T61, T62 in sixth period T6 (movable display period) as in frame F1. Movable screen 1a is at the legitimate reference position (prescribed position Ps1) before movement of movable screen 1a (before start of period T61). Meanwhile, movable screen 1a is at a position deviated from prescribed position Ps1 after movement of movable screen 1a (after end of period T62). As a result, the reference position at the end point of frame F2 is deviated from prescribed position Ps1 on the absolute coordinates.

Then, also in frame F3, the reference position is corrected and is set again on prescribed position Ps1 by executing the position detection processing and the correcting processing in first period T1 (non-display period) as in frame F2. In display device 10, deviation of the reference position from prescribed position Ps1 is modified in each frame by repeating operation similar to the operation in frames F1, F2, and F3 described above. This reduces an amount of deviation of the reference position from prescribed position Ps on the absolute coordinates.

In the example of FIG. 9C, it is assumed that a "reference position" that serves as a reference of movement of movable screen 1a by drive controller 51 matches prescribed position Ps1 at the start point of frame F1. Accordingly, in period Tx of the "forward path" of frame F1, movable screen 1a is fixed at the reference position (prescribed position Ps1). In other words, during second period T2 in period Tx of the "forward path", with movable screen 1a being fixed at the reference position, first image 701 is formed on movable screen 1*a*, thereby projecting first virtual image 301 onto target space 400.

On the other hand, in period Ty of the "return path" of frame F1, the position of movable screen 1*a* in movement direction X is changed in synchronization with timing when second image 702 is drawn. In FIG. 9C, period T61 in sixth period T6 (movable display period) is a period in which second image 702 is being drawn. In other words, with movable screen 1*a* being moved from reference position (prescribed position Ps1) in first direction X1, second image 702 is formed on movable screen 1*a*, thereby projecting second virtual image 302 onto target space 400. At this time, a moving speed of movable screen 1*a* is constant. Each time second image 702 is formed, movable screen 1*a* is moved in second direction X2 to return to the reference position in period T62 immediately after period T61. In the example of FIG. 9C, it is assumed that the reference position after the return is slightly deviated from prescribed position Ps1 on the absolute coordinates in second direction X2. Accordingly, at the end point of frame F1 (at the start point of frame F2), movable screen 1*a* is at a position deviated from prescribed position Ps1.

Accordingly, at least to the end point of second period T2 in period Tx of the "forward path" of frame F2, movable screen 1*a* is fixed at the reference position deviated from prescribed position Ps1. In other words, during second period T2, with movable screen 1*a* being fixed at a position deviated from prescribed position Ps1, first image 701 is formed on movable screen 1*a*, thereby projecting first virtual image 301 onto target space 400.

In display device 10, position detector 52 moves movable screen 1*a* and executes the position detection processing in third period T3 (fixed display period) of frame F2. As described above, in the fixed display period, fixed screen 1*b* is being selected as a target screen by projector 40. That is, the fixed display period is same as the non-display period in which movable screen 1*a* is not irradiated with light from projector 40 used in the description of FIG. 9A.

In FIG. 9C, period T31 in third period T3 is a period in which the position detection processing is executed. In this case, position detector 52 moves movable screen 1*a* such that movable screen 1*a* passes a detection position (prescribed position Ps1) by moving movable screen 1*a* at prescribed amplitude in movement direction X. Position detector 52 detects that movable screen 1*a* is located at the detection position at a moment when movable screen 1*a* passes the detection position (prescribed position Ps1). That is, in the example of FIG. 9C, position detector 52 detects that movable screen 1*a* is located at the detection position at time t0 at which movable screen 1*a* passes prescribed position Ps1.

Furthermore, in third period T3 (fixed display period) of frame F2, corrector 53 executes correcting processing for moving movable screen 1*a* to prescribed position Ps1 based on a detection result of position detector 52. in FIG. 9C, period T32 in third period T3 is a period in which the correcting processing is executed. In this case, corrector 53 moves movable screen 1*a* to prescribed position Ps1 by moving movable screen 1*a* in movement direction X based on the detection result of position detector 52 and an amount of movement of movable screen 1*a* after passage through the detection position. That is, corrector 53 corrects the reference position by moving movable screen 1*a* to prescribed position Ps1 that is a legitimate reference position on the absolute coordinates based on the detection result of position detector 52.

Specifically, corrector 53 detects a direction and an amount of movement of movable screen 1*a* from time t0 at which position detector 52 detects that movable screen 1*a* is located at the detection position, for example, based on an output of position sensor 6. Corrector 53 moves movable screen 1*a* to the legitimate reference position (prescribed position Ps1) by moving movable screen 1*a* toward a side opposite to the detected direction of movement by the amount of movement thus detected. In the example of FIG. 9C, in frame F2, corrector 53 moves movable screen 1*a* in second direction X2 since movable screen 1*a* has moved in first direction X1 from time to. Accordingly, the position of movable screen 1*a* is at the legitimate reference position (prescribed position Ps1) at the end point of period Tx of the "forward path" (the start point of the "return path") of frame F2.

During period Ty of the "return path" of frame F2, movable screen 1*a* moves in periods T61, T62 in sixth period T6 (movable display period) as in frame F1. Movable screen 1*a* is at the legitimate reference position (prescribed position Ps1) before movement of movable screen 1*a* (before start of period T61).

Meanwhile, movable screen 1*a* is at a position deviated from prescribed position Ps1 after movement of movable screen 1*a* (after end of period T62). As a result, the reference position at the end point of frame F2 is deviated from prescribed position Ps1 on the absolute coordinates.

Then, also in frame F3, the reference position is corrected and is set again on prescribed position Ps1 by executing the position detection processing and the correcting processing in third period T3 (fixed display period) as in frame F2. In display device 10, deviation of the reference position from prescribed position Ps1 is modified in each frame by repeating operation similar to the operation in frames F2 and F3 described above. This reduces an amount of deviation of the reference position from prescribed position Ps on the absolute coordinates.

Meanwhile, in the comparative example illustrated in FIG. 9B, deviation of the reference position from prescribed position Ps1 is not modified in each frame. Accordingly, there is a possibility that an amount of deviation of the reference position from prescribed position Ps1 becomes large. That is, in the comparative example, as a result of movement of movable screen 1*a* in periods T61, T62 in period Ty of the "return path" of frame F1, the reference position at the end point of frame F1 is deviated from prescribed position Ps1 on the absolute coordinates. In the example of FIG. 9B, the reference position at the end point of frame F1 is slightly deviated from prescribed position Ps1 in first direction X1. In a case where the reference position is deviated every time a screen moves, an amount of deviation of the reference position from prescribed position Ps1 is accumulated, and therefore there is a possibility that an amount of deviation of the reference position from prescribed position Ps1 gradually increases.

During second period T2 in period Tx of the "forward path", with movable screen 1*a* being fixed at the reference position, first image 701 is formed on movable screen 1*a*, thereby projecting first virtual image 301 onto target space 400. During sixth period T6 (movable display period) in period Ty of the "return path", with movable screen 1*a* moving based on the reference position, second image 702 is formed on movable screen 1*a*, thereby projecting second virtual image 302 onto target space 400. In a case where a variation in reference position with respect to prescribed position Ps1 becomes large as in the comparative example, there is a possibility that a variation in distance from driver's eyes to a virtual image becomes large. Meanwhile, in display device 10, a variation in reference position is reduced, and it is therefore possible to reduce a variation in distance from driver's eyes to virtual image 300 (first virtual image 301 or second virtual image 302). Furthermore, in a case where a variation in reference position is reduced, a variation in size of luminescent spot B1 (see FIG. 4A) formed on front surface 11 of movable screen 1a can be kept relatively small. As a result, in display device 10, resolution of image 700 formed on movable screen 1a by light from irradiator 3 can be suppressed from lowering, advantageously suppressing resolution of virtual image 300 from lowering.

Although it is assumed that second virtual image 302 is projected one time during sixth period T6 in the example of FIGS. 9A and 9C, second virtual image 302 may be projected a plurality of times during sixth period T6. That is, the processing (periods T61, T62) for forming second image 702 is performed a plurality of times (e.g., three times), thereby projecting a plurality (e.g., three pieces) of second virtual images 302 having different viewing distances onto target space 400 (refer to FIG. 2). In this case, a viewing distance of second virtual image 302 becomes longer as a position where second image 702 is formed on movable screen 1a becomes closer to first end part 111. In a case where second virtual image 302 is projected a plurality of times during sixth period T6, movable screen 1a moves a plurality of times during sixth period T6, and therefore deviation of the reference position from prescribed position Ps1 can occur every time movable screen 1a moves. In display device 10, the reference position is corrected every cycle (frame) in which scanner 32 reciprocates one time in the longitudinal direction of movable screen 1a, and therefore deviation of the reference position from prescribed position Ps1 is reduced.

(4) Modifications

The first exemplary embodiment is merely one of various exemplary embodiments of the present disclosure. The first exemplary embodiment can be variously modified in accordance with a design, for example, as long as the object of the present disclosure can be achieved. Furthermore, the aspect according to the first exemplary embodiment is not limited to be embodied by a display device alone. The aspect according to the first exemplary embodiment may be embodied by a system, a method for controlling a display device, a computer program, or a recording medium storing a program, for example.

Hereinafter, modifications of the first exemplary embodiment will be listed. The modifications described below can be applied while being combined as appropriate.

In a first modification of the first exemplary embodiment, position detector 52 may be configured to be capable of changing a search range. The "search range" is a range in which movable screen 1a moves in a case where position detector 52 executes the position detection processing. That is, first, in the position detection processing, position detector 52 detects whether or not movable screen 1a is located at the detection position (prescribed position Ps1) by moving movable screen 1a located at the reference position in movement direction X at specified amplitude (in the search range). In a case where position detector 52 does not detect that movable screen 1a is located at the detection position, position detector 52 executes the position detection processing by moving movable screen 1a again after changing the search range.

As a specific example of change of the search range in the first modification, position detector 52, for example, enlarges the search range in movement direction X by increasing the amplitude of movable screen 1a in the position detection processing. Alternatively, for example, position detector 52 may change the search range by changing a movement start position of movable screen 1a in the position detection processing and thereby shifting the search range in movement direction X. Furthermore, position detector 52 may change the search range by combining enlargement of the search range and shift of the search range. According to this modification, in the position detection processing, the search range in which position detector 52 moves movable screen 1a for the first time can be set relatively small. This leads to a reduction in electric power consumption of driving unit 2, lowering of operation sound of driving unit 2, and the like caused by movement of movable screen 1a in the position detection processing.

Furthermore, the non-display period in which position detector 52 executes the position detection processing may include the fixed display period in which fixed screen 1b is being selected as a target screen by projector 40 (projection optical system 4 and irradiator 3). That is, since movable screen 1a is not irradiated with light from projector 40 even in the fixed display period, the fixed display period may be included in the non-display period for execution of the position detection processing. For example, in the example of FIG. 9A, position detector 52 may execute the position detection processing in third period T3 or fifth period T5 that is the fixed display period.

Furthermore, position detector 52 may detect that movable screen 1a is located at the detection position based on a detection signal from position sensor 6 during a period other than the non-display period or the fixed display period, for example, during projection of first virtual image 301 or second virtual image 302. That is, in a case where movable screen 1a passes the detection position as a result of movement of movable screen 1a by drive controller 51, position detector 52 can detect that movable screen 1a is located at the detection position based on a detection signal from position sensor 6 obtained at this time. In this modification, position detector 52 may execute the position detection processing in the non-display period or the fixed display period only in a case where movable screen 1a has not passed the detection position as a result of movement of movable screen 1a by drive controller 51. For example, in some cases, position detector 52 just needs to detect that movable screen 1a is located at the detection position one time per predetermined period. In such cases, position detector 52 just needs to execute the position detection processing in the non-display period or the fixed display period only in a case where a state where movable screen 1a does not pass the detection position continues for a predetermined period.

Furthermore, the correcting processing performed by corrector 53 is not essential for display device 10 and may be omitted as appropriate. In this case, for example, movable screen 1a can be stopped at the detection position (prescribed position Ps1) by finishing movement of movable screen 1a by position detector 52 at a time at which position detector 52 detects that movable screen 1a is located at the detection position. This reduces deviation of the reference position from prescribed position Ps1 without the correcting processing.

Although prescribed position Ps1 and the detection position match each other in the first exemplary embodiment, the detection position just needs to be set in relation to prescribed position Ps1. For example, the detection position may be a position deviated by a predetermined amount from prescribed position Ps1 in first direction X1 or second direction X2. In this case, in a case where the detection position can be specified by position detector 52, corrector 53 can specify prescribed position Ps1 based on the detection position and the predetermined amount.

Control circuit 5 just needs to be configured to control driving unit and irradiator 3, and a function for controlling driving unit 2 and a function for controlling irradiator 3 need not be integrated. For example, a controller that controls driving unit 2 and a controller that controls irradiator 3 may be separately provided and may synchronize with each other.

Furthermore, display device 10 may have three or more screens 1 instead of two screens 1 made up of single movable screen 1a and single fixed screen 1b. For example, three or more screens 1 may be made up of two or more fixed screens 1b and single movable screen 1a or may be made up of two or more movable screens 1a and single fixed screen 1b. Furthermore, four or more screens 1 may be made up of two or more movable screens 1a and two or more fixed screens 1b. Also in this case, position detector 52 moves movable screen 1a and executes the position detection processing in the non-display period in which movable screen 1a is not irradiated with light from projector 40. In other words, position detector 52 moves movable screen 1a and executes the position detection processing in the fixed display period in which fixed screen 1b is being selected as a target screen by projector 40. Corrector 53 moves movable screen 1a to the prescribed position based on a detection result of position detector 52. This makes it possible to reduce deviation of the reference position of one or two or more movable screens 1a from prescribed position Ps1.

Although an example in which position detector 52 executes the position detection processing during first period T1 that is a non-display period of the "forward path" has been described in the example of FIG. 9A, the present exemplary embodiment is not limited to this example, and position detector 52 just needs to execute the position detection processing in the non-display period. For example, position detector 52 may execute the position detection processing in seventh period T7 that is a non-display period of the "return path" or fourth period T4 that is a non-display period that straddles the "forward path" and the "return path". Furthermore, position detector 52 may execute the position detection processing in two or more of first period T1, fourth period T4, and seventh period T7. The correcting processing performed by corrector 53 need not be executed in a same non-display period as the position detection processing performed by position detector 52. For example, position detector 52 may execute the position detection processing in first period T1, and corrector 53 may execute the correcting processing in fourth period T4.

Similarly, although an example in which position detector 52 executes the position detection processing during third period T3 that is the fixed display period of the "forward path" has been described in the example of FIG. 9C, the present exemplary embodiment is not limited to this example, and position detector 52 just needs to execute the position detection processing in the fixed display period. For example, position detector 52 may execute the position detection processing in fifth period T5 that is the fixed display period of the "return path" or may execute the position detection processing both in third period T3 and fifth period T5. The correcting processing performed by corrector 53 need not be executed in a same fixed display period as the position detection processing performed by position detector 52. For example, position detector 52 may execute the position detection processing in third period T3, and corrector 53 may execute the correcting processing in fifth period T5.

Drive controller 51 is not limited to such a configuration that, when first virtual image 301 is to be formed, movable screen 1a is fixed in movement direction X. Such a configuration may be applied in which, when first virtual image 301 is to be formed, movable screen 1a moves in movement direction X. For example, in period Tx of the "forward path", drive controller 51 continues to move movable screen 1a in first direction X1. On the other hand, in period Ty of the "return path", only in a period where second image 702 is being drawn, drive controller 51 causes movable screen 1a to move in first direction X1, and, in other periods, drive controller 51 causes movable screen 1a to move in second direction X2. According to this modification, it is possible to keep a movement range of movable screen 1a narrower than a configuration in which movable screen 1a is parallel with reference plane 503.

Furthermore, movable screen 1a may be parallel with reference plane 503. Also in this case, position detector 52 moves movable screen 1a and executes the position detection processing in the non-display period in which movable screen 1a is not irradiated with light from projector 40. In other words, position detector 52 moves movable screen 1a and executes the position detection processing in the fixed display period in which fixed screen 1b is being selected as a target screen by projector 40. Corrector 53 moves movable screen 1a to the prescribed position based on a detection result of position detector 52. This makes it possible to reduce deviation of the reference position of movable screen 1a from prescribed position Ps1. Furthermore, fixed screen 1b is not limited to the configuration in which fixed screen 1b is parallel with reference plane 503, and fixed screen 1b may be inclined with respect to reference plane 503 as in the case of movable screen 1a.

Display device 10 is not limited to the configuration that simultaneously projects first virtual image 301, second virtual image 302, and third virtual image 303 and may have a mode for projecting only first virtual image 301 and a mode for projecting only second virtual image 302, for example. Similarly, display device 10 may have a mode for projecting only first virtual image 301 and third virtual image 303, a mode for projecting only second virtual image 302 and third virtual image 303, and a mode for projecting only third virtual image 303.

The operation state of irradiator 3 may be only either the first scanning state (forward path) or the second scanning state (return path). In this case, first virtual image 301, second virtual image 302, and third virtual image 303 are formed in either the first scanning state (forward path) or the second scanning state (return path).

Furthermore, in the first exemplary embodiment, the configuration in which first virtual image 301 is formed only in the first scanning state (forward path) and second virtual image 302 is formed only in the second scanning state (return path) has been described, but the present disclosure is not limited to this configuration. For example, first virtual image 301 may be formed only in the second scanning state (return path) and second virtual image 302 may be formed only in the first scanning state (forward path). Alternatively, first virtual image 301 or second virtual image 302 may be formed in both the first scanning state (forward path) and the second scanning state (return path). Furthermore, both first virtual image 301 and second virtual image 302 may be formed in both the first scanning state (forward path) and the second scanning state (return path). In this case, as for at least parts of first virtual image 301 and second virtual image 302, luminance of virtual image 300 can be increased by forming identical virtual image 300 in both the first scanning state (forward path) and the second scanning state (return path). The present exemplary embodiment is not limited to a configuration in which third virtual image 303 is formed in both of the first scanning state (forward path) and the second scanning state (return path), and third virtual image 303 may be formed only in the first scanning state (forward path) or only in the second scanning state (return path).

The scanning range of irradiator 3 on front surface 11 of movable screen 1a in the longitudinal direction inclined with respect to reference plane 503 may be wider when second virtual image 302 is formed than when first virtual image 301 is formed.

As illustrated in FIG. 2, projecting the plurality (three pieces, in this case) of second virtual images 302 having the different viewing distances onto target space 400 is not essential to display device 10. Only single second virtual image 302 may be projected onto target space 400.

Drive controller 51 may control driving unit 2 so as to suppress rapid acceleration and deceleration of movable screen 1a in movement direction X. Specifically, drive controller 51 defines a control pattern of driving unit 2 so as to suppress acceleration imposed on movable screen 1a to be less than or equal to a prescribed value, for example, upon switching between a state with movable screen 1a being stopped and a state with movable screen 1a being moved.

In screen 1, a "display plane" may be at least a plane used to form image 700. The display plane is not limited to front surface 11 of screen 1, but may be rear surface 12 of screen 1, for example. Furthermore, front surface 11 (or rear surface 12) of screen 1 may not wholly serve as a "display plane". The "display plane" may be a partial region on front surface 11 (or rear surface 12) of screen 1. In this case, image 700 is to be formed on the partial region on front surface 11 (or rear surface 12) of screen 1.

Screen 1 is not limited to the configuration in which only front surface 11 of screen 1 has light-diffusing properties. For example, only rear surface 12 or both front surface 11 and rear surface 12 may have light-diffusing properties. In a case where rear surface 12 of screen 1 has light-diffusing properties, image 700 is formed on rear surface 12 of screen 1.

Furthermore, display device 10 is not limited to the configuration of projecting virtual image 300 onto target space 400 set in front of vehicle 100 in the traveling direction. For example, display device 10 may project virtual image 300 onto a side portion, rear portion, upper portion and the like in the traveling direction of vehicle 100.

Movable screen 1a is not only rectilinearly moved in movement direction X. For example, movable screen 1a may be rotatable so as to change inclination angle θ of front surface 11 with respect to reference plane 503.

Projection optical system 4 may include or may not include a relay optical system for forming an intermediate image.

In addition, display device 10 is not limited to the head-up display for use in vehicle 100. For example, display device 10 is also applicable as a display for a moving body other than vehicle 100, the other moving body including a motorcycle having protection against wind, a train, an aircraft, a construction machine, a vessel, and the like. Moreover, the place of use of display device 10 is not limited to the moving body. For example, display device 10 may be used in an amusement facility. Display device 10 may also be used as a wearable terminal such as a head mounted display (HMD). Furthermore, display device 10 may be used at a medical facility, and may be used as a stationary device.

Second Exemplary Embodiment

According to display device 10 according to a second exemplary embodiment of the present disclosure, position detector 52 executes position detection processing while using, as a trigger, movement of movable screen 1a by drive controller 51 in a movable display period. In this respect, display device 10 according to the second exemplary embodiment is different from display device 10 according to the first exemplary embodiment. A basic configuration in the present exemplary embodiment is similar to the configuration of FIG. 3 referred to in the first exemplary embodiment. Hereinafter, constituent elements identical to those of the first exemplary embodiment are given identical reference signs and explanations thereof will be omitted.

In the present exemplary embodiment, a movable display period in which movable screen 1a is irradiated with light from projector 40 is intermittently set as in the first exemplary embodiment. That is, a movable display period in which movable screen 1a is being selected as a target screen by projector 40 is intermittently set. In the movable display period thus intermittently set, drive controller 51 moves movable screen 1a only in a case where second virtual image 302 is projected instead of moving movable screen 1a each time. That is, in the movable display period intermittently set, display device 10 projects second virtual image 302, for example, only at timing at which an instruction is given from a driving assistance system mounted in vehicle 100 instead of projecting second virtual image 302 each time. In a movable display period in which second virtual image 302 is not projected, movable screen 1a does not move, and therefore a reference position is not deviated from prescribed position Ps1.

In view of this, in the present exemplary embodiment, position detector 52 executes the position detection processing while using, as a trigger, movement of movable screen 1a by drive controller 51 in a movable display period. That is, the position detection processing is executed only in a case where movable screen 1a moves in the movable display period. In other words, position detector 52 does not execute the position detection processing in a case where drive controller 51 does not move movable screen 1a in a movable display period.

Figure 10A:
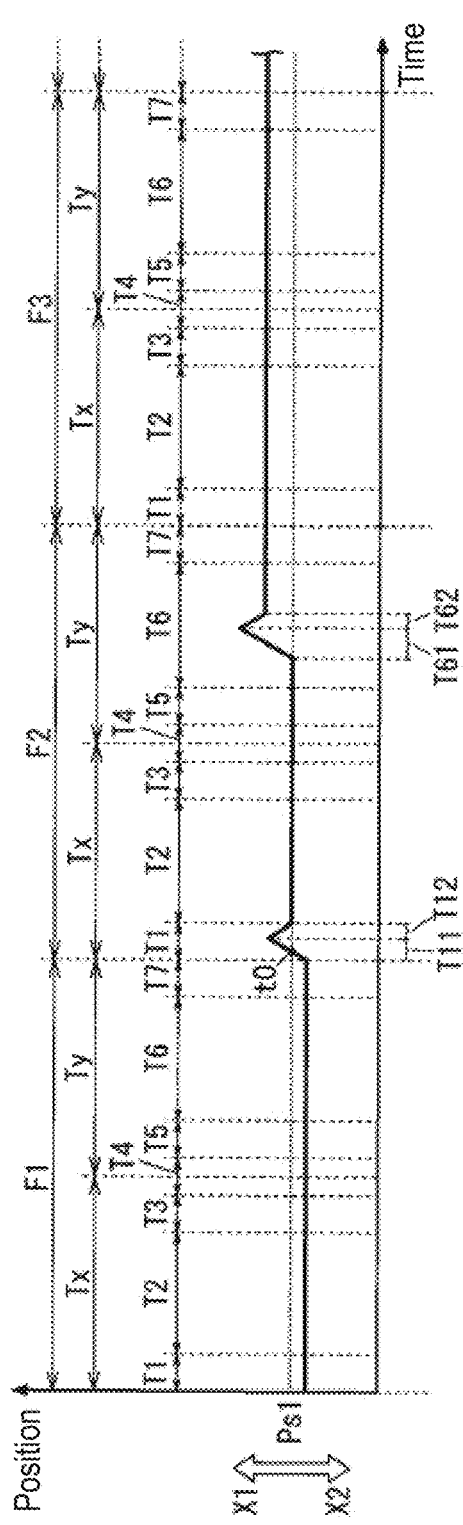
FIG. 10A is a graph illustrating a temporal change of a position of a screen in a case where position detection processing is executed before a movable display period in a display device according to a second exemplary embodiment of the present disclosure.
Figure 10B:
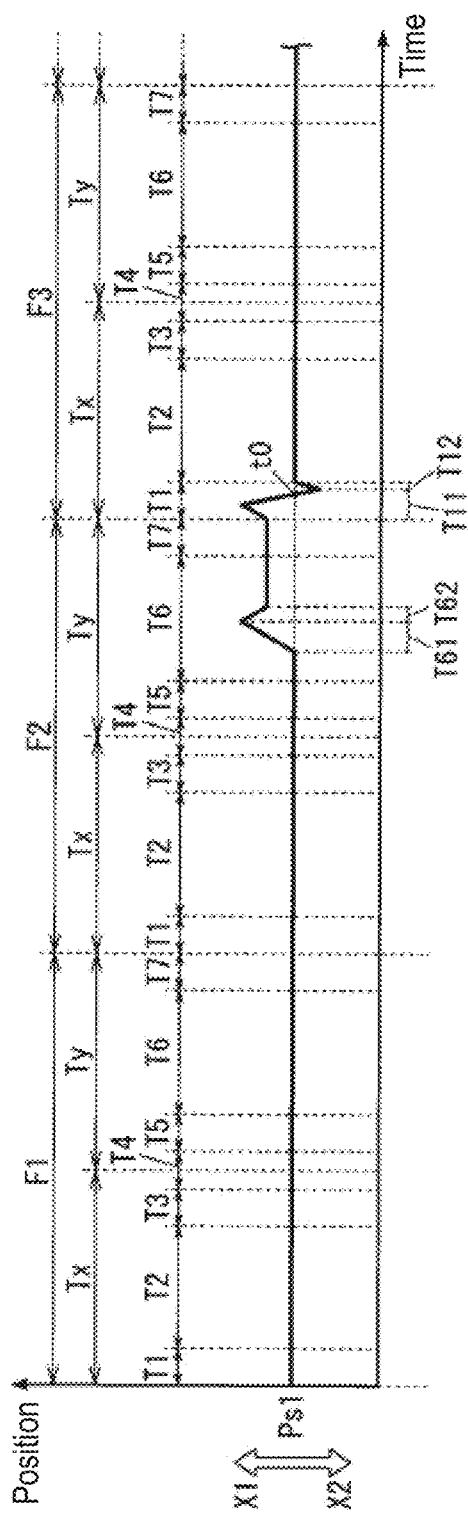
FIG. 10B is a graph illustrating a temporal change of a position of a screen in a case where the position detection processing is executed after the movable display period in the display device according to the second exemplary embodiment of the present disclosure.
Figure 10C:
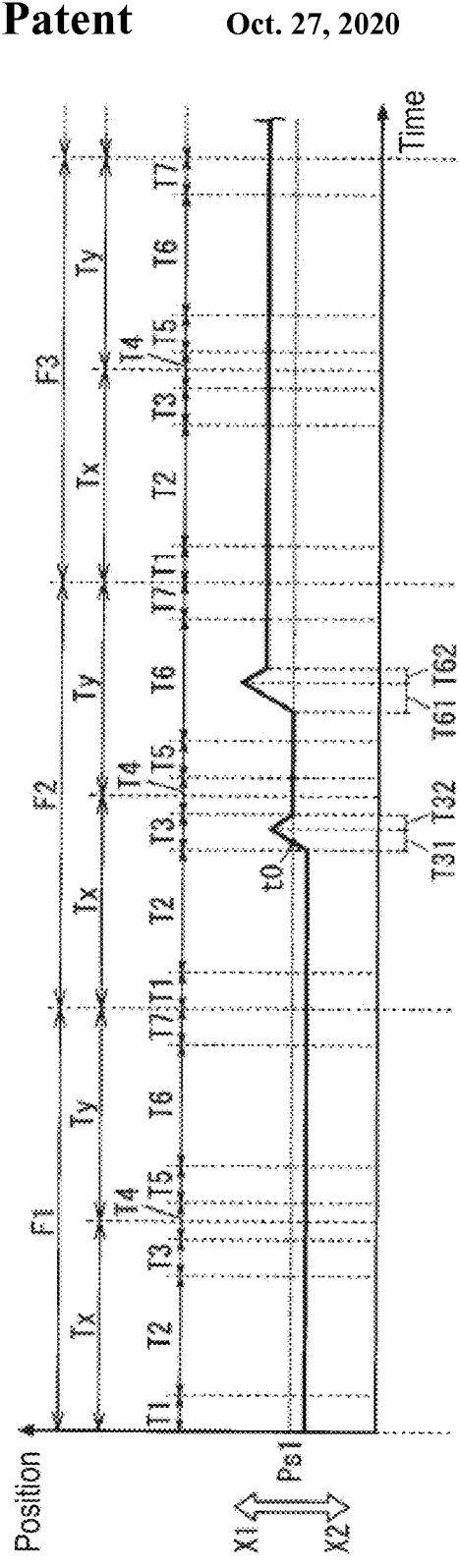
FIG. 10C is another graph illustrating a temporal change of a position of a screen in a case where position detection processing is executed before a movable display period in the display device according to the second exemplary embodiment of the present disclosure.
Figure 10D:
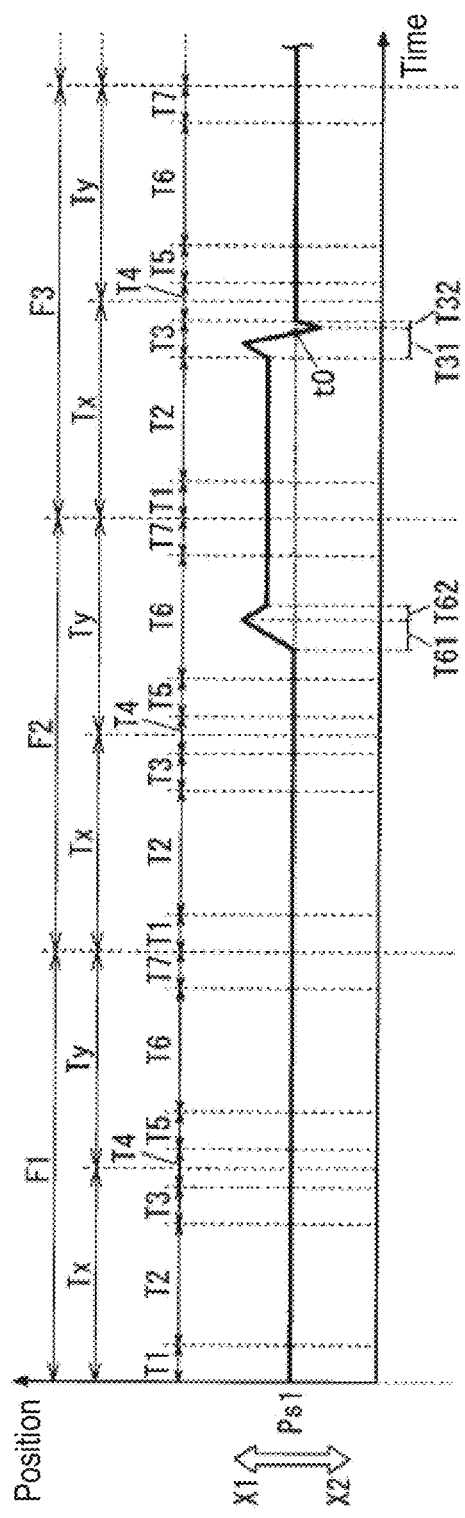
FIG. 10D is another graph illustrating a temporal change of a position of a screen in a case where position detection processing is executed after a movable display period in the display device according to the second exemplary embodiment of the present disclosure.

Specifically, in a case where drive controller 51 moves movable screen 1a in a movable display period, position detector 52 executes the position detection processing in a non-display period before or after this movable display period. The following describes a case where the position detection processing is executed before the movable display period and a case where the position detection processing is executed after the movable display period with reference to FIGS. 10A through 10D. FIGS. 10A and 10C are graphs illustrating a temporal change of a position of movable screen 1a in movement direction X in a case where the position detection processing is executed before the movable display period. FIGS. 10B and 10D are similar graphs in a case where the position detection processing is executed after the movable display period. In FIGS. 10A through 10D, a horizontal axis is a time axis, and the position of movable screen 1a is indicated along a vertical axis.

First, a case where position detector 52 executes the position detection processing before the movable display period in which drive controller 51 moves movable screen 1a is described. In the example of FIG. 10A, second virtual image 302 is projected only in frame F2 among frames F1, F2, and F3. That is, movable screen 1a is moved by drive controller 51 only in sixth period T6 (movable display period) in period Ty of the "return path" of frame F2 and is not moved by drive controller 51 in sixth period T6 (movable display period) in period Ty of the "return path" of frames F1, F3. In this case, the position detection processing is executed by position detector 52 and the correcting processing is executed by corrector 53 in a non-display period (first period T1 of frame F2) before sixth period T6 of frame F2. Accordingly, the reference position has been corrected and set again on prescribed position Ps1 in the movable display period (sixth period T6 of frame F2) in which movable screen 1a is moved by drive controller 51.

In the example of FIG. 10C, second virtual image 302 is projected only in frame F2 among frames F1, F2, and F3. That is, movable screen 1a is moved by drive controller 51 only in sixth period T6 (movable display period) in period Ty of the "return path" of frame F2 and is not moved by drive controller 51 in sixth period T6 (movable display period) in period Ty of the "return path" of frames F1, F3. In this case, the position detection processing is executed by position detector 52 and the correcting processing is executed by corrector 53 in a fixed display period (third period T3 of frame F2) immediately before sixth period T6 of frame F2. Accordingly, the reference position has been corrected and set again on prescribed position Ps1 in the movable display period (sixth period T6 of frame F2) in which movable screen 1a is moved by drive controller 51.

Next, a case where position detector 52 executes the position detection processing after the movable display period in which drive controller 51 has moved movable screen 1a is described. In the example of FIG. 10B, second virtual image 302 is projected only in frame F2 among frames F1, F2, and F3. That is, movable screen 1a is moved by drive controller 51 only in sixth period T6 (movable display period) in period Ty of the "return path" of frame F2 and is not moved by drive controller 51 in sixth period T6 (movable display period) in period Ty of the "return path" of frames F1, F3. In this case, the position detection processing is executed by position detector 52 and the correcting processing is executed by corrector 53 in a non-display period (first period T1 of frame F3) after sixth period T6 of frame F2. Accordingly, deviation of the reference position from prescribed position Ps1 that occurs in the movable display period (sixth period T6 of frame F2) in which movable screen 1a is moved by drive controller 51 is modified after this movable display period.

In the example of FIG. 10D, second virtual image 302 is projected only in frame F2 among frames F1, F2, and F3. That is, movable screen 1a is moved by drive controller 51 only in sixth period T6 (movable display period) in period Ty of the "return path" of frame F2 and is not moved by drive controller 51 in sixth period T6 (movable display period) in period Ty of the "return path" of frames F1, F3. In this case, the position detection processing is executed by position detector 52 and the correcting processing is executed by corrector 53 in a fixed display period (third period T3 of frame F3) immediately after sixth period T6 of frame F2. Accordingly, deviation of the reference position from prescribed position Ps1 that occurs in the movable display period (sixth period T6 of frame F2) in which movable screen 1a is moved by drive controller 51 is modified immediately after this movable display period.

In a case where the position detection processing is executed before the movable display period, position detector 52, for example, determines whether or not second virtual image 302 is projected based on a signal from a driving assistance system mounted in vehicle 100 and decides whether or not to execute the position detection processing. In a case where the position detection processing is executed after the movable display period, position detector 52 decides whether or not to execute the position detection processing in association with drive controller 51. Accordingly, in a case where the position detection processing is executed after the movable display period, processing for deciding whether or not position detector 52 executes the position detection processing is completed in display device 10 without need for a signal from an outside (e.g., a driving assistance system) of display device 10.

Figure 11:
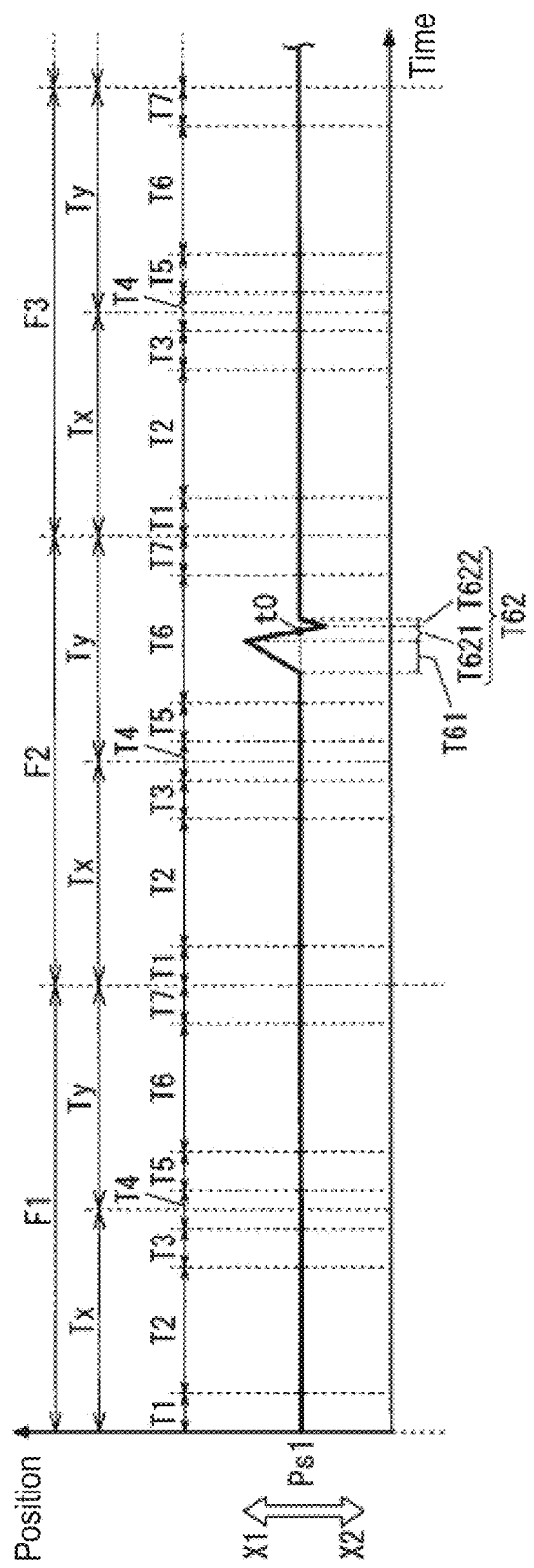
FIG. 11 is a graph illustrating a temporal change of a position of a screen in a case where position detection processing is executed in a non-display period in which a drive controller performs return processing in the display device according to the second exemplary embodiment of the present disclosure.

Furthermore, as a specific example in which execution of the position detection processing is triggered by movement of movable screen 1a by drive controller 51 in the movable display period, position detector 52 may be configured to execute the position detection processing in a non-display period in which drive controller 51 performs return processing. That is, since drive controller 51 is configured to execute the return processing for returning movable screen 1a to the reference position every time movable screen 1a is moved, position detector 52 can use movement of movable screen 1a in the return processing for the position detection processing. An example in which the position detection processing is executed in a non-display period in which drive controller 51 performs the return processing is described with reference to FIG. 11. FIG. 11 is a graph, similar to FIG. 10B, illustrating a temporal change of a position of movable screen 1a in movement direction X. In FIG. 11, a horizontal axis is a time axis, and a position of movable screen 1a is indicated along a vertical axis.

In the example of FIG. 11, second virtual image 302 is projected only in frame F2 among frames F1, F2, and F3. That is, movable screen 1a is moved by drive controller 51 only in sixth period T6 (movable display period) in period Ty of the "return path" of frame F2 and is not moved by drive controller 51 in sixth period T6 (movable display period) in period Ty of the "return path" of frames F1, F3. In this case, drive controller 51 moves movable screen 1a relative to the reference position in period T61 of frame F2 and performs return processing for returning movable screen 1a to the reference position in period T62 immediately after period T61. The position detection processing is executed by position detector 52 and the correcting processing is executed by corrector 53 in period T62 in which drive controller 51 performs the return processing.

That is, period T62 is further divided into periods T621, T622, and position detector 52 executes the position detection processing in period T621, and corrector 53 executes the correcting processing in period T622 based on a result of the position detection processing. Accordingly, deviation of the reference position from prescribed position Ps1 that occurs in the movable display period (sixth period T6 of frame F2) in which movable screen 1a is moved by drive controller 51 is modified within sixth period T6. That is, whole sixth period T6 does not correspond to a movable display period in which movable screen 1a is irradiated with light from projector 40, and period T62 in which drive controller 51 performs the return processing corresponds to a non-display period in which movable screen 1a is not irradiated with light from projector 40. Accordingly, position detector 52 can execute the position detection processing in period T62.

As described above, with display device 10 according to the present exemplary embodiment, execution of the position detection processing is triggered by movement of movable screen 1a by drive controller 51 in a movable display period, and therefore a frequency of the position detection processing can be reduced. That is, in a movable display period in which second virtual image 302 is not projected, the reference position is not deviated from prescribed position Ps1 originally, and therefore a variation in reference position is not influenced even in a case where the position detection processing is not performed. This leads to a reduction in electric power consumption of driving unit 2, lowering of operation sound of driving unit 2, and the like caused by movement of movable screen 1a in the position detection processing. In particular, in a configuration in which position detector 52 executes the position detection processing in a non-display period in which drive controller 51 performs the return processing, a frequency of movement of movable screen 1a can be reduced as compared with a case where driving unit 2 moves movable screen 1a just for the position detection processing.

As described above, in FIGS. 10A and 10B, the position detection processing is executed by position detector 52 in a non-display period in frame F2 identical to the movable display period in which drive controller 51 moves movable screen 1a or in frame F3 next to the movable display period. Furthermore, in FIGS. 10C and 10D, the position detection processing is executed by position detector 52 in a fixed display period immediately before or immediately after the movable display period in which drive controller 51 moves movable screen 1a. However, a period in which the position detection processing is executed is not limited to these examples. For example, the position detection processing may be executed by position detector 52 in a non-display period that is certain period before or certain period after a movable display period in which drive controller 51 moves movable screen 1a.

The configuration of display device 10 according to the second exemplary embodiment (including the modifications) can be combined with the configuration of display device 10 according to the first exemplary embodiment (including the modifications) as appropriate.

Third Exemplary Embodiment

Figure 12:
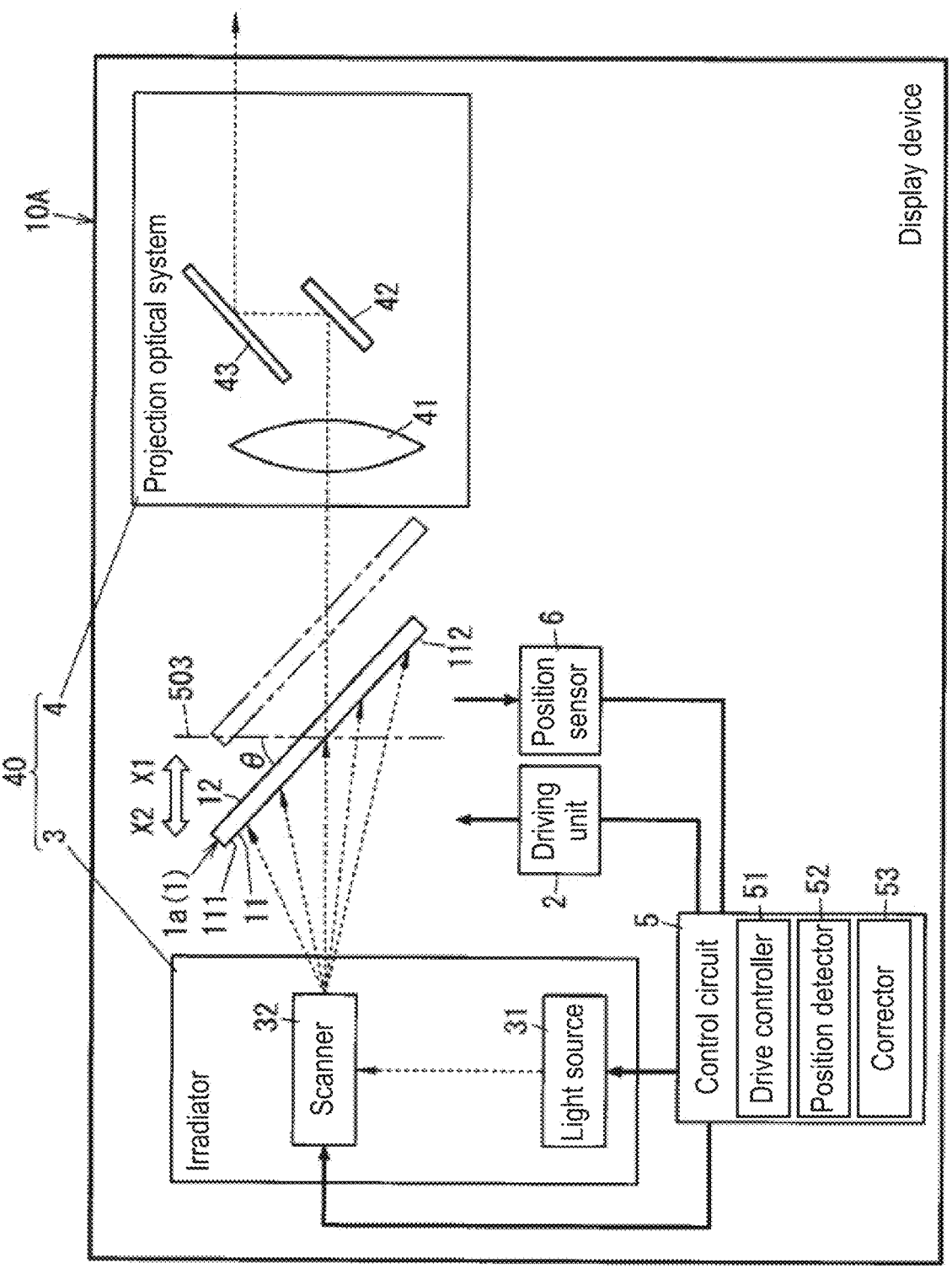
FIG. 12 is a conceptual diagram illustrating a configuration of the display device according to a third exemplary embodiment of the present disclosure.

FIG. 12 is a conceptual diagram illustrating a configuration of display device 10A according to a third exemplary embodiment of the present disclosure. Display device 10A is different from display device 10 according to the first exemplary embodiment in that display device 10A has only movable screen 1a as screen 1. Hereinafter, constituent elements identical to those of the first exemplary embodiment are given identical reference signs and explanations thereof will be omitted.

That is, in the present exemplary embodiment, fixed screen 1b illustrated in FIG. 3 is omitted, and projector 40 (projection optical system 4 and irradiator 3) performs drawing only on movable screen 1a. That is, projector 40 always selects movable screen 1a as a target screen and performs drawing on movable screen 1a by irradiating movable screen 1a with light used for scanning movable screen 1a. Then, projector 40 projects virtual image 300 (first virtual image 301 or second virtual image 302) onto target space 400 based on light that passes through movable screen 1a.

Operation of display device 10A is, for example, identical to the operation illustrated in FIG. 9A except for that third period T3 and fifth period T5 that are fixed display periods are omitted. In this case, second period T2 is extended by third period T3, and sixth period T6 is extended by fifth period T5. Also in this case, position detector 52 moves movable screen 1a and executes the position detection processing in a non-display period (first period T1, fourth period T4, or seventh period T7) in which movable screen 1a is not irradiated with light from projector 40.

In the third exemplary embodiment, display device 10A has only one movable screen 1a, but the third exemplary embodiment is not limited to this example. Display device 10A may have a plurality of movable screens 1a.

The configuration of display device 10A according to the third exemplary embodiment (including the modifications) can be combined with the configuration of display device 10 according to the first exemplary embodiment (including the modifications) and the second exemplary embodiment (including the modifications) as appropriate.

The drawings illustrated in each exemplary embodiment described above are merely conceptual diagrams for explaining an example of display devices 10, 10A, and are different in shapes, sizes, positional relationships, and the like of the members from actual display devices 10, 10A as appropriate.

(Overview)

As described above, display devices 10, 10A have movable screen 1a, drive controller 51, projector 40, and position detector 52. Movable screen 1a is movable in movement direction X. Drive controller 51 moves movable screen 1a relative to a reference position set at prescribed position Ps1 in movement direction X of movable screen 1a. Projector 40 performs drawing on movable screen 1a by irradiating movable screen 1a with light used for scanning movable screen 1a and projects virtual image 300 onto target space 400 based on light that passes through movable screen 1a. Position detector 52 executes position detection processing for detecting that movable screen 1a is located at a detection position set in relation to prescribed position Ps1. Position detector 52 is configured to move movable screen 1a and execute the position detection processing in a non-display period in which movable screen 1a is not irradiated with light from projector 40.

According to this configuration, the position detection processing for detecting a detection position of movable screen 1a is executed by using a non-display period in which movement of movable screen 1a does not influence projection of virtual image 300. Accordingly, position detector 52 can move movable screen 1a and detect a detection position of movable screen 1a without influencing projection of virtual image 300. Therefore, in a case where the reference position is deviated from prescribed position Ps1, this deviation can be detected, and a variation in reference position can be reduced. As a result, it is possible to reduce a variation in distance from eyes of user 200 to virtual image 300 caused by the variation in reference position.

Position detector 52 may be configured to move movable screen 1a in a control pattern different from drive controller 51 in a non-display period. According to this configuration, even in a case where the position detection processing cannot be efficiently performed just by movement of movable screen 1a by drive controller 51, the position detection processing can be efficiently performed by movement of movable screen 1a by position detector 52.

Display devices 10, 10A may further have corrector 53. Corrector 53 is configured to move movable screen 1a to prescribed position Ps1 based on at least a detection result of position detector 52. According to this configuration, in a case where the reference position is deviated from prescribed position Ps1, the reference position is corrected by corrector 53, and therefore a variation in reference position can be further reduced.

Position detector 52 may execute the position detection processing by moving movable screen 1a such that movable screen 1a passes a detection position in a non-display period. Corrector 53 may move movable screen 1a to prescribed position Ps1 based on a detection result of position detector 52 and an amount of movement of movable screen 1a after passage through the detection position. According to this configuration, since movable screen 1a passes the detection position once in the position detection processing and is then returned to the detection position by corrector 53, acceleration applied to movable screen 1a can be reduced as compared with a case where movable screen 1a rapidly stops at the detection position. As a result, occurrence of a pulse-shaped high-frequency component is suppressed in a driving current of driving unit 2. This can lessen impact imposed on movable screen 1a and driving unit 2 and suppress generation of noise due to the high-frequency component.

Position detector 52 may be configured to detect passage of movable screen 1a through the detection position. According to this configuration, position detector 52 can execute the position detection processing with a relatively simple configuration by using position sensor 6 such as an optical encoder.

In display devices 10, 10A, a movable display period in which drive controller 51 moves movable screen 1a and movable screen 1a is irradiated with light from projector 40 may be intermittently set. Position detector 52 may be configured to execute the position detection processing while using, as a trigger, movement of movable screen 1a by drive controller 51 in the movable display period. According to this configuration, it is possible to reduce a frequency of the position detection processing. That is, in a movable display period in which drive controller 51 does not move movable screen 1a, the reference position is not deviated from prescribed position Ps1 originally, and therefore a variation in reference position is not influenced even in a case where the position detection processing is not performed. In such a movable display period, position detector 52 does not execute the position detection processing. This leads to a reduction in electric power consumption of driving unit 2, lowering of operation sound of driving unit 2, and the like related to movement of movable screen 1a in the position detection processing.

Position detector 52 may be configured to execute the position detection processing before a movable display period in which drive controller 51 moves movable screen 1a. According to this configuration, it is possible to detect deviation of a reference position from prescribed position Ps1 before start of the movable display period in which drive controller 51 moves movable screen 1a, and therefore it is possible to reduce a variation in reference position.

Position detector 52 may be configured to execute the position detection processing after a movable display period in which drive controller 51 has moved movable screen 1a. According to this configuration, processing for deciding whether or not position detector 52 executes the position detection processing can be completed in display device 10, 10A without need for a signal from an outside (e.g., a driving assistance system) of display device 10, 10A.

Drive controller 51 may be configured to execute return processing for returning movable screen 1a to the reference position in a non-display period every time movable screen 1a is moved. Position detector 52 may be configured to execute the position detection processing in the non-display period in which drive controller 51 performs return processing. According to this configuration, it is possible to reduce a frequency of movement of movable screen 1a as compared with a case where movable screen 1a is moved just for the position detection processing. This leads to a reduction in electric power consumption of driving unit 2, lowering of operation sound of driving unit 2, and the like related to movement of movable screen 1a.

Position detector 52 may be configured to, in a case where position detector 52 moves movable screen 1a within a search range in a non-display period and does not detect that movable screen 1a is located at the detection position, execute the position detection processing by moving movable screen 1a again after changing the search range. According to this configuration, a search range in which position detector 52 moves movable screen 1a for a first time in the position detection processing can be set relatively small. This leads to a reduction in electric power consumption of driving unit 2, lowering of operation sound of driving unit 2, and the like related to movement of movable screen 1a in the position detection processing.

Movable screen 1a may be configured to have front surface 11 inclined with respect to movement direction X, and projector 40 may be configured to irradiate movable screen 1a with light for scanning front surface 11 of movable screen 1a. According to this configuration, a movement range of movable screen 1a can be kept relatively narrow in a case of virtual image 300 whose inclination angle with respect to optical axis 500 of projector 40 is relatively small. The reduced movement range of movable screen 1a leads to a decrease in size of driving unit 2 (actuator) for moving movable screen 1a, a reduction in electric power consumption of driving unit 2, and lowering of operating sound of driving unit 2, for example.

Drive controller 51 may fix movable screen 1a in movement direction X in a case where first virtual image 301 serving as virtual image 300 is formed on first virtual plane 501. Inclination angle α of first virtual plane 501 with respect to optical axis 500 of projector 40 is smaller than predetermined value γ. Drive controller 51 may be configured to move movable screen 1a in movement direction X in a case where second virtual image 302 serving as virtual image 300 is formed on second virtual plane 502. Inclination angle β of second virtual plane 502 with respect to optical axis 500 of projector 40 is larger than predetermined value γ. According to this configuration, first virtual image 301 whose inclination angle α with respect to optical axis 500 of projector 40 is relatively small, that is, first virtual image 301 whose angle with respect to road surface 600 is shallow when viewed from user 200 is projected with movable screen 1a being fixed. Therefore, the moving range of screen 1 can be kept narrow, as compared with a case where movable screen 1a is moved in a case where first virtual image 301 is projected.

Movable screen 1a may be one of a plurality of screens 1 including fixed screen 1b, and display devices 10, 10A may have a plurality of screens 1. In this case, projector 40 selects one of the plurality of screens 1 as a target screen. Projector 40 performs drawing on the target screen by irradiating the target screen with light used for scanning the target screen and projects virtual image 300 onto target space 400 based on light that passes through the target screen. As described above, the non-display period is identical to a fixed display period in which fixed screen 1b is being selected as a target screen.

According to this configuration, position detection processing for detecting a detection position of movable screen 1a is executed by using a fixed display period in which movement of movable screen 1a does not influence projection of virtual image 300. Therefore, position detector 52 can move movable screen 1a and detect the detection position of movable screen 1a without influencing projection of virtual image 300. Therefore, in a case where the reference position is deviated from prescribed position Ps1, this deviation can be detected, and a variation in reference position can be reduced. As a result, it is possible to reduce a variation in distance from eyes of user 200 to virtual image 300 caused by the variation in reference position.

A method for controlling display device 10, 10A is a method for controlling display device 10, 10A that has movable screen 1a, drive controller 51, projector 40, and position detector 52. Movable screen 1a is movable in movement direction X. Drive controller 51 moves movable screen 1a relative to a reference position set at prescribed position Ps1 in a movement range of movable screen 1a. Projector 40 performs drawing on movable screen 1a by irradiating movable screen 1a with light used for scanning movable screen 1a and projects virtual image 300 onto target space 400 based on light that passes through movable screen 1a. Position detector 52 executes position detection processing for detecting that movable screen 1a is located at a detection position set in relation to prescribed position Ps1. In the method for controlling display device 10, 10A, movable screen 1a is moved, and the position detection processing is executed by position detector 52 in a non-display period in which movable screen 1a is not irradiated with light from projector 40.

According to this method, the position detection processing for detecting the detection position of movable screen 1a is executed by using a non-display period in which movement of movable screen 1a does not influence projection of virtual image 300. Therefore, position detector 52 can move movable screen 1a and detect the detection position of movable screen 1a without influencing projection of virtual image 300. Therefore, in a case where the reference position is deviated from prescribed position Ps1, this deviation can be detected, and a variation in reference position can be reduced. As a result, it is possible to reduce a variation in distance from eyes of user 200 to virtual image 300 caused by the variation in reference position.

A program according to an exemplary embodiment of the present disclosure causes a computer to execute the aforementioned control method. According to this program, a variation in distance from eyes of user 200 to virtual image 300 can be reduced even in a case where a general-purpose computer is used. Furthermore, this program may be used in a state where the program is recorded in a non-transitory recording medium.

Vehicle 100 that is an example of a moving body according to an exemplary embodiment of the present disclosure has display device 10, 10A described above, windshield 101, main body 104, and moving body driving unit 106. Windshield 101 that serves as a reflective member reflects light from projector 40 of display device 10, 10A. Main body 104 contains therein display device 10, 10A and windshield 101. Moving body driving unit 106 moves main body 104.

According to this configuration, position detection processing for detecting a detection position of movable screen 1a is executed by using a non-display period in which movement of movable screen 1a does not influence projection of virtual image 300. Therefore, position detector 52 can move movable screen 1a and detect the detection position of movable screen 1a without influencing projection of virtual image 300. Therefore, in a case where the reference position is deviated from prescribed position Ps1, this deviation can be detected, and a variation in reference position can be reduced. As a result, it is possible to reduce a variation in distance from eyes of user 200 to virtual image 300 caused by the variation in reference position.

A display device, a method for controlling the display device, a program, a recording medium, and a moving body having the display device according to the present disclosure has an advantage of reducing a variation in distance from user's eyes to a virtual image. Therefore, the display device, the method for controlling the display device, the program, the recording medium, and the moving body having the display device according to the present disclosure are useful for an in-vehicle display device.

What is claimed is:

1. A display device comprising:
   a movable screen that is movable in a movement direction;
   a drive controller that moves the movable screen relative to a reference position set at a prescribed position in a movement range of the movable screen;
   a projector that performs drawing on the movable screen by irradiating the movable screen with light used for scanning the movable screen and projects a virtual image onto a target space based on light that passes through the movable screen;
   a position detector that executes position detection processing for detecting that the movable screen is located at a detection position set in relation to the prescribed position; and
   a corrector that moves the movable screen to the prescribed position based on at least a detection result of the position detector,
   wherein the position detector is configured to move the movable screen and execute the position detection processing in a non-display period in which the movable screen is not irradiated with light from the projector.

2. The display device according to claim 1, wherein the position detector is configured to move the movable screen in a control pattern different from the drive controller in the non-display period.

3. The display device according to claim 1, wherein
   the position detector executes the position detection processing by moving the movable screen so as to pass the detection position in the non-display period, and
   the corrector is configured to move the movable screen to the prescribed position based on the detection result of the position detector and an amount of movement of the movable screen after passage through the detection position.

4. The display device according to claim 1, wherein the position detector is configured to detect passage of the movable screen through the detection position.

5. The display device according to claim 1, wherein
   a movable display period in which the drive controller moves the movable screen and the movable screen that is moving is irradiated with light from the projector is intermittently set, and
   the position detector is configured to execute the position detection processing while using, as a trigger, movement of the movable screen by the drive controller in the movable display period.

6. The display device according to claim 5, wherein the position detector is configured to execute the position detection processing before the movable display period.

7. The display device according to claim 5, wherein the position detector is configured to execute the position detection processing after the movable display period.

8. The display device according to claim 5, wherein
the drive controller is configured to execute return processing for returning the movable screen to the reference position in the non-display period every time the movable screen is moved, and
the position detector is configured to execute the position detection processing in the non-display period in which the drive controller executes the return processing.

9. The display device according to claim 1, wherein the position detector is configured to execute the position detection processing in the non-display period by moving the movable screen within a search range and, in a case where the position detector does not detect that the movable screen is located at the detection position, moving the movable screen again after changing the search range.

10. The display device according to claim 1, wherein
the movable screen has a front surface inclined with respect to the movement direction, and
the projector is configured to irradiate the movable screen with light used for scanning the front surface of the movable screen.

11. The display device according to claim 10, wherein
the drive controller is configured to
fix the movable screen in the movement direction in a case where a first virtual image serving as the virtual image is formed on a first virtual plane whose inclination angle with respect to an optical axis of the projector is smaller than a predetermined value, and
move the movable screen in the movement direction in a case where a second virtual image serving as the virtual image is formed on a second virtual plane whose inclination angle with respect to the optical axis of the projector is larger than the predetermined value.

12. The display device according to claim 1, wherein
the movable screen is one of a plurality of screens including a fixed screen, and the display device includes the plurality of screens,
the projector selects one of the plurality of screens as a target screen, and performs drawing on the target screen by irradiating the target screen with light used for scanning the target screen to project the virtual image onto the target space based on light that passes through the target screen, and
the non-display period is a fixed display period in which the fixed screen is being selected as the target screen.

13. A method for controlling a display device including
a movable screen that is movable in a movement direction,
a drive controller that moves the movable screen relative to a reference position set at a prescribed position in a movement range of the movable screen,
a projector that performs drawing on the movable screen by irradiating the movable screen with light used for scanning the movable screen and projects a virtual image onto a target space based on light that passes through the movable screen,
a position detector that executes position detection processing for detecting that the movable screen is located at a detection position set in relation to the prescribed position, and
a corrector that moves the movable screen to the prescribed position based on at least a detection result of the position detector,
the method comprising:
moving the movable screen in a non-display period in which the movable screen is not irradiated with light from the projector; and
causing the position detector to execute the position detection processing in the non-display period.

14. A program for causing a computer to execute the method for controlling the display device according to claim 13.

15. A non-transitory recording medium recording a program for causing a computer to execute the method for controlling the display device according to claim 13.

16. A moving body comprising:
the display device according to claim 1;
a reflective member that reflects light from the projector;
a main body that houses the display device and the reflective member; and
a moving body driving unit that moves the main body.

* * * * *